(12) United States Patent
Shimizu et al.

(10) Patent No.: US 10,421,418 B2
(45) Date of Patent: Sep. 24, 2019

(54) WIRE HARNESS ARRANGEMENT STRUCTURE OF VEHICLE

(71) Applicant: MAZDA MOTOR CORPORATION, Hiroshima (JP)

(72) Inventors: Masaaki Shimizu, Iwakuni (JP); Taro Tamagawa, Kure (JP); Sadahisa Yamada, Hiroshima (JP); Osamu Michihira, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 153 days.

(21) Appl. No.: 15/656,463

(22) Filed: Jul. 21, 2017

(65) Prior Publication Data
US 2018/0029541 A1 Feb. 1, 2018

(30) Foreign Application Priority Data
Jul. 29, 2016 (JP) .................................. 2016-150482

(51) Int. Cl.
  *B60R 16/02* (2006.01)
  *B60R 16/023* (2006.01)
  *B60R 16/03* (2006.01)

(52) U.S. Cl.
  CPC ...... *B60R 16/0207* (2013.01); *B60R 16/0231* (2013.01); *B60R 16/03* (2013.01)

(58) Field of Classification Search
  USPC .................................................. 307/9.1, 10.1
  See application file for complete search history.

(56) References Cited

U.S. PATENT DOCUMENTS

2004/0227402 A1* 11/2004 Fehr .................... B60R 16/0315
                                                              307/10.1

FOREIGN PATENT DOCUMENTS

| JP | H06-112939 A | | 4/1994 |
| JP | 2006-051922 | * | 2/2006 |
| JP | 2006-051922 A | | 2/2006 |
| JP | 2014-034373 A | | 2/2014 |

\* cited by examiner

*Primary Examiner* — Rexford N Barnie
*Assistant Examiner* — Xuan Ly
(74) *Attorney, Agent, or Firm* — Studebaker & Brackett PC

(57) ABSTRACT

The present invention relates to a wire harness arrangement structure of a vehicle, comprising plural component control parts to control plural electric components for governing a drive of the vehicle, a main control part to generate a command signal for providing a command to the plural component control parts, and plural main wire harnesses to transmit the command signal to the plural component control parts. The plural electric components include at least a brake, an engine, a transmission, and a steering, the plural main wire harnesses comprise first signal transmission routes which extend from the main control part to the plural component control parts, respectively, and second signal transmission routes which extend from the main control part to the plural component control parts, respectively, and the command signal is transmitted to the main control part to the plural component control parts through the first and second signal transmission routes.

7 Claims, 15 Drawing Sheets

WIRE HARNESS ARRANGEMENT STRUCTURE OF VEHICLE

BACKGROUND OF THE INVENTION

The present invention relates to a signal transmission technology of a vehicle.

Various vehicle driving technologies have been developed recently. For example, one of many onboard CPUs (Central Processing Units) which are installed to the vehicle is used as a main control part to control other CPUs totally. This main control part may be configured to determine various target values of a vehicle speed, a vehicle acceleration, a vehicle traveling direction, a braking force to be applied to the vehicle, or a traction to be transmitted to a road surface from the vehicle based on information provided from various onboard sensors or cameras. These target values determined by the main control part are transmitted to the other CPUs through wire harnesses (see Japanese Patent Laid-Open Publication No. 2014-34373).

The other CPUs are used as component control parts to control corresponding electric components (an engine, a transmission, a brake, or a steering, for example). The component control parts which receive the target values from the main control part control the corresponding electric components so that the target values of the speed, the acceleration, the traveling direction, the braking force, or the traction can be achieved.

According to the technology disclosed by the above-described patent document, the signal transmission from the main control part to the component control parts relies on a single signal transmission route. If the vehicle contacts an obstacle softly (another vehicle, for example) and the signal transmission route is shut down (damaged), the information transmission from the main control part to the component control parts may be stopped. In a case where the component control parts control the electric components for governing a drive of the vehicle, such as the engine, the transmission, the brake, or the steering, the above-described information-transmission stop may cause the loss of controls of basic motions of the vehicle, such as "vehicle advancing," "vehicle retreating," "vehicle traveling-direction changing," or "vehicle stopping."

SUMMARY OF THE INVENTION

An object of the present invention is to provide a wire harness arrangement structure of a vehicle which can transmit the information provided from the main control part to the plural component control parts to govern the drive of the vehicle, such as the engine, the transmission, the brake, or the steering, with high reliability.

The present invention is a wire harness arrangement structure of a vehicle, comprising plural component control parts to control plural electric components for governing a drive of the vehicle, a main control part to generate a command signal for providing a command to the plural component control parts, and plural main wire harnesses to transmit the command signal to the plural component control parts, wherein the plural electric components include at least a brake, an engine, a transmission, and a steering, the plural main wire harnesses comprise first signal transmission routes which extend from the main control part to the plural component control parts, respectively, and second signal transmission routes which extend from the main control part to the plural component control parts, respectively, and the command signal is transmitted from the main control part to the plural component control parts through the first signal transmission routes and the second signal transmission routes.

According to the present invention, since the plural main wire harnesses comprise the first signal transmission routes and the second signal transmission routes, even if either one of the first signal transmission routes and the second signal transmission routes is shut down, the command signal transmission from the main control part to the plural component control parts to control the electric components, such as the brake, the engine, the transmission, and the steering, can be maintained. Accordingly, the basic motions of the vehicle, such as "proceeding," "retreating," "curving," or "stopping," can be maintained properly after either one of the first signal transmission routes and the second signal transmission routes has been shut down.

In the above-described wire harness arrangement structure, the plural component control parts to control the brake, the engine, the transmission, and the steering may be electrically connected only to the first signal transmission routes and the second signal transmission routes. According to this structure, the gross weight of the wire harness arranged in the vehicle does not increase unnecessarily. Additionally, the wire harness arrangement structure of the vehicle does not become complex unnecessarily.

In the above-described wire harness arrangement structure, this structure may further comprise a sub control part to control another onboard component than the brake, the engine, the transmission, and the steering, and a sub wire harness to constitute a single-line signal transmission route between the above-described sub control part and the main control part. According to this structure, since the sub control part to control the other onboard component than the brake, the engine, the transmission, and the steering is connected to the main control part through the sub wire harness constituting the single-line signal transmission route, the gross weight of the wire harness arranged in the vehicle does not increase unnecessarily. Additionally, the wire harness arrangement structure of the vehicle does not become complex unnecessarily.

In the above-described wire harness arrangement structure, the plural component control parts may be provided between a front end of the vehicle and a dash panel of the vehicle, and the main control part may be provided in back of the dash panel. According to this structure, since the plural component control parts are provided between the front end of the vehicle and the dash panel of the vehicle, the signal routes for signal transmission from the plural component control parts to the plural electric components, such as the brake, the engine, the transmission, or the steering are shortened. Further, since the main control part is provided in back of the dash panel, the performance of the main control part is properly maintained even if the vehicle collides with an obstacle.

In the above-described wire harness arrangement structure, the first signal transmission route may constitute at least partially a first transmission path which extends in a first direction which is directed toward the front end of the vehicle from the dash panel, at least part of the second signal transmission route may constitute a second transmission path which is spaced apart from the first transmission path in a second direction perpendicular to the first direction and extends in the first direction, and at least part of the plural electric components may be provided between the first transmission path and the second transmission path. According to this structure, since the second transmission path is spaced apart from the first transmission path in the second direction such that at least part of the plural electric components is arranged between the first transmission path and the second transmission path, either one of the first transmission path and the second transmission path maintains the signal transmission performance properly even if the vehicle collides with the obstacle.

In the above-described wire harness arrangement structure, part of the first signal transmission route may constitute a third transmission path which extends in the second direction along the dash panel of the vehicle, part of the second signal transmission route may constitute a fourth transmission path which is spaced apart from the third transmission path in the first direction and extends in the second direction, and at least part of the plural electric components may be provided between the third transmission path and the fourth transmission path. According to this structure, since the fourth transmission path is spaced apart from the third transmission path in the first direction such that at least part of the plural electric components is arranged between the third transmission path and the fourth transmission path, either one of the third transmission path and the fourth transmission path maintains the signal transmission performance properly even if the vehicle collides with the obstacle.

In the above-described wire harness arrangement structure, the vehicle may include a first engine frame which extends between the front end of the vehicle and the dash panel and a second engine frame which extends between the front end of the vehicle and the dash panel at a position which is spaced apart from the first engine frame in the second direction, the first transmission path may be formed along the first engine frame, and the second transmission path may be formed along the second engine frame. According to this structure, since the first transmission path is formed along the first engine frame and the second transmission path is formed along the second engine frame, the first signal transmission route and the second signal transmission route are protected by the first engine frame and the second engine frame.

In the above-described wire harness arrangement structure, a first penetration hole and a second penetration hole may be formed at the dash panel, the second penetration hole may be provided at a position which is offset, in the second direction, from the first penetration hole, and the plural main wire harnesses may include a first wire harness which extends from the main control part toward the first penetration hole and a second wire harness which extends from the main control part toward the second penetration hole. According to this structure, since the plural main wire harnesses include the first wire harness extending from the main control part toward the first penetration hole and the second wire harness extending from the main control part toward the second penetration hole, either one of the first wire harness and the second wire harness maintains the signal transmission performance properly even if the vehicle collides with the obstacle at its left face or its right face.

In the above-described wire harness arrangement structure, the vehicle may include a reinforcing frame which extends in the second direction in back of the dash panel, and the first wire harness and the second wire harness may be provided to extend along the reinforcing frame. According to this structure, since the first wire harness and the second wire harness are provided to extend along the reinforcing frame, a signal transmission loop is protected by the reinforcing frame.

Other features, aspects, and advantages of the present invention will become apparent from the following description which refers to the accompanying drawings.

DETAILED DESCRIPTION OF THE INVENTION

Embodiment 1

The present inventors and other developed a control system which includes a main control part and plural component control parts. The main control part controls the plural component control parts totally. The plural component control parts respectively control their corresponding electric components (a brake, an engine, a transmission, or a steering, for example). The main control part sets motion targets (a target value of a braking force, an engine speed, a target value of a traction, a steering direction or a steering angle) of the electric components in accordance with traveling environments (conditions) of the vehicle. A command signal which represents the target motions is outputted to the plural component control parts from the main control part. The plural component control parts respectively control the corresponding electric components so that the corresponding electric components achieve (meet) the motion targets. Accordingly, the control system can contribute to an automatic driving of the vehicle greatly. Transmission of the command signals between the main control part and the plural component control parts is very important. For example, if the command signals from the main control part to the component control parts governing the engine control stop, the engine control is lost. In a first embodiment, an arrangement structure of a wire harness which attains the high reliability of the command-signal transmission will be described.

Figure 1:
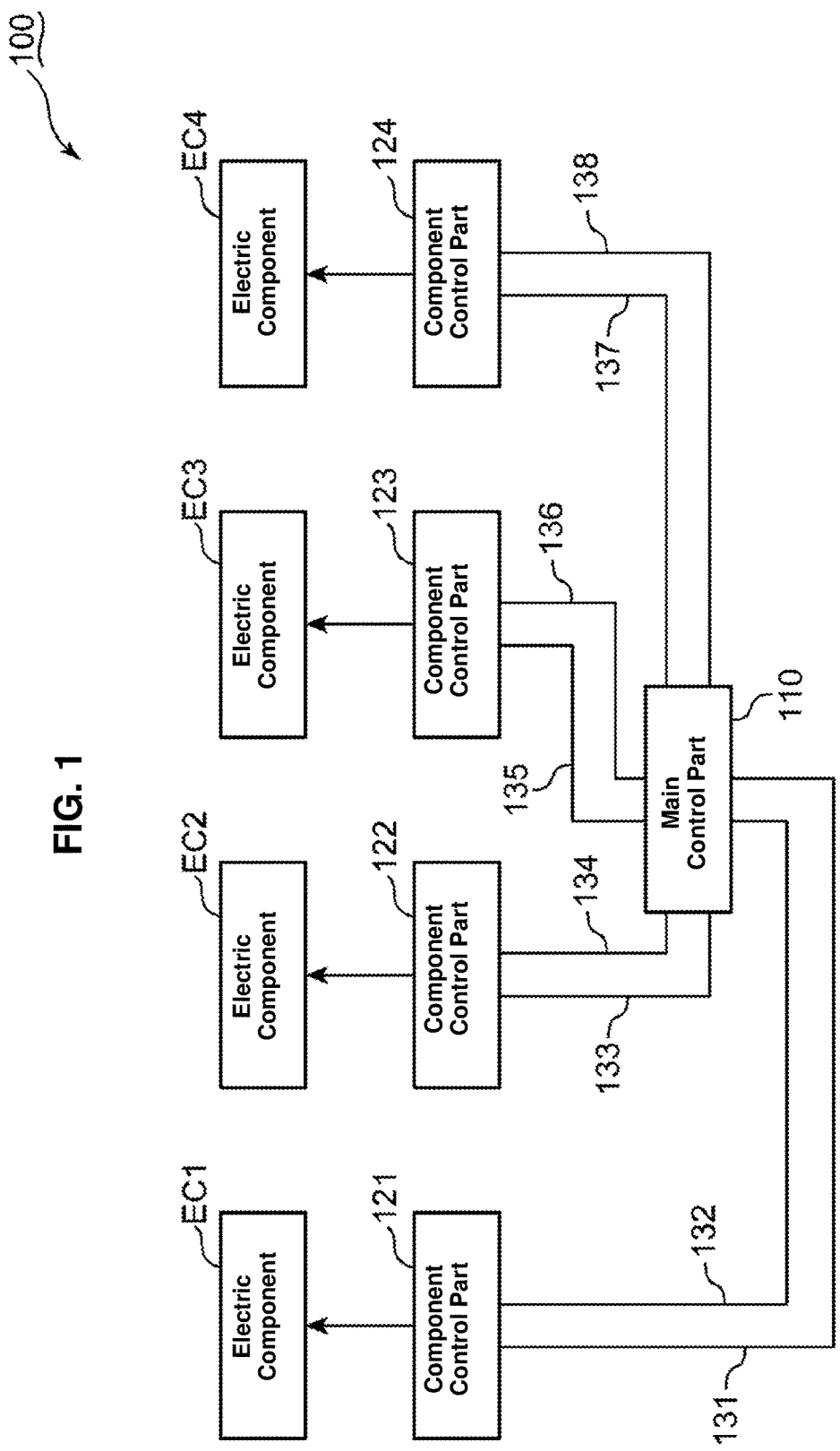
FIG. 1 is a conceptual block diagram of a wire harness arrangement structure of a first embodiment.

FIG. 1 is a conceptual block diagram of an arrangement structure of a wire harness of the first embodiment (hereafter, referred to as an arrangement structure 100). The arrangement structure 100 will be described referring to FIG. 1.

The arrangement structure 100 comprises a main control part 110, four component control parts 121, 122, 123, 124, and eight wire harnesses 131-138. The wire harnesses 131, 132 are connected to the main control part 110 and the component control part 121. The wire harnesses 133, 134 are connected to the main control part 110 and the component control part 122. The wire harnesses 135, 136 are connected to the main control part 110 and the component control part 123. The wire harnesses 137, 138 are connected to the main control part 110 and the component control part 124.

FIG. 1 shows four electric components EC1, EC2, EC3, CE4 which govern a drive of a vehicle (not illustrated). The electric component EC1 may be one of the brake, the engine, the transmission, and the steering. The electric component EC2 may be another one of the brake, the engine, the transmission, and the steering. The electric component EC3 may be further another one of the brake, the engine, the transmission, and the steering. The electric component EC4 may be the last one of the brake, the engine, the transmission, and the steering.

The main control part 110 generates command signals to command the component control parts 121, 122, 123, 124. The command signals may represent targets of the motions of the electric components EC1, EC2, EC3, CE4. For example, the command signals may represent a braking force to be applied to the vehicle, a vehicle speed, a vehicle acceleration, a traction to be transmitted to a road surface from the vehicle, a traveling direction, or a vehicle steering angle. A doctrine of the present embodiment is not limited to a particular target to be represented by the command signal.

The main control part 110 outputs the command signals to the wire harnesses 131-138. The command signals are transmitted to the component control parts 121, 122, 123, 124 from the main control part 110 through the wire harnesses 131-138. The component control parts 121, 122, 123, 124 respectively control the electric components EC1, EC2, EC3, EC4 in accordance with the command signals.

In a case where the electric component EC1 is the brake, the component control part 121 may adjust an oil pressure to be applied to a disc brake in accordance with the command signal. In a case where the electric component EC2 is the engine, the component control part 122 may adjust an ignition timing or speed of the engine in accordance with the command signal. In a case where the electric component EC3 is the transmission, the component control part 123 may change gears (a third gear to a fourth gear, for example) in accordance with the command signal. In a case where the electric component EC4 is the steering, the component control part 124 may rotate a steering shaft clockwise or counterclockwise by a specified angle in accordance with the command signal. The doctrine of the present embodiment is not limited to a particular control to be executed by the component control parts 121, 122, 123, 124.

When either one of the wire harnesses 131, 132 is broken, the main control part 110 can transmit the command signal to the component control part 121 through the other one of the wire harnesses 131, 132. When either one of the wire harnesses 133, 134 is broken, the main control part 110 can transmit the command signal to the component control part 122 through the other one of the wire harnesses 133, 134. When either one of the wire harnesses 135, 136 is broken, the main control part 110 can transmit the command signal to the component control part 123 through the other one of the wire harnesses 135, 136. When either one of the wire harnesses 137, 138 is broken, the main control part 110 can transmit the command signal to the component control part 124 through the other one of the wire harnesses 137, 138. In the present embodiment, a first signal transmission route is exemplified by either one of the wire harnesses 131, 132, either one of the wire harnesses 133, 134, either one of the wire harnesses 135, 136, or either one of the wire harnesses 137, 138. A second signal transmission route is exemplified by the other one of the wire harnesses 131, 132, the other one of the wire harnesses 133, 134, the other one of the wire harnesses 135, 136, or the other one of the wire harnesses 137, 138.

Embodiment 2

The main control part may be connected to various control units (i.e., CPUs (Central Processing Units)) to control the vehicle. In this case, designers may connect the main control part and the plural CPUs which govern the drive of the vehicle, such as the brake, the engine, the transmission, and the steering, by using a plural-line wire-harness connecting structure. Meanwhile, the designers may connect the main control part and other CPUs (which govern other controls which are irrelevant to the drive of the vehicle) by using a single-line connecting structure. In this case, the gross weight of the plural wire harnesses connecting the main control part and the plural CPUs does not increase unnecessarily. In the second embodiment, an exemplified wire harness arrangement structure including the plural-line connecting structure and the single-line connecting structure will be described.

Figure 2:
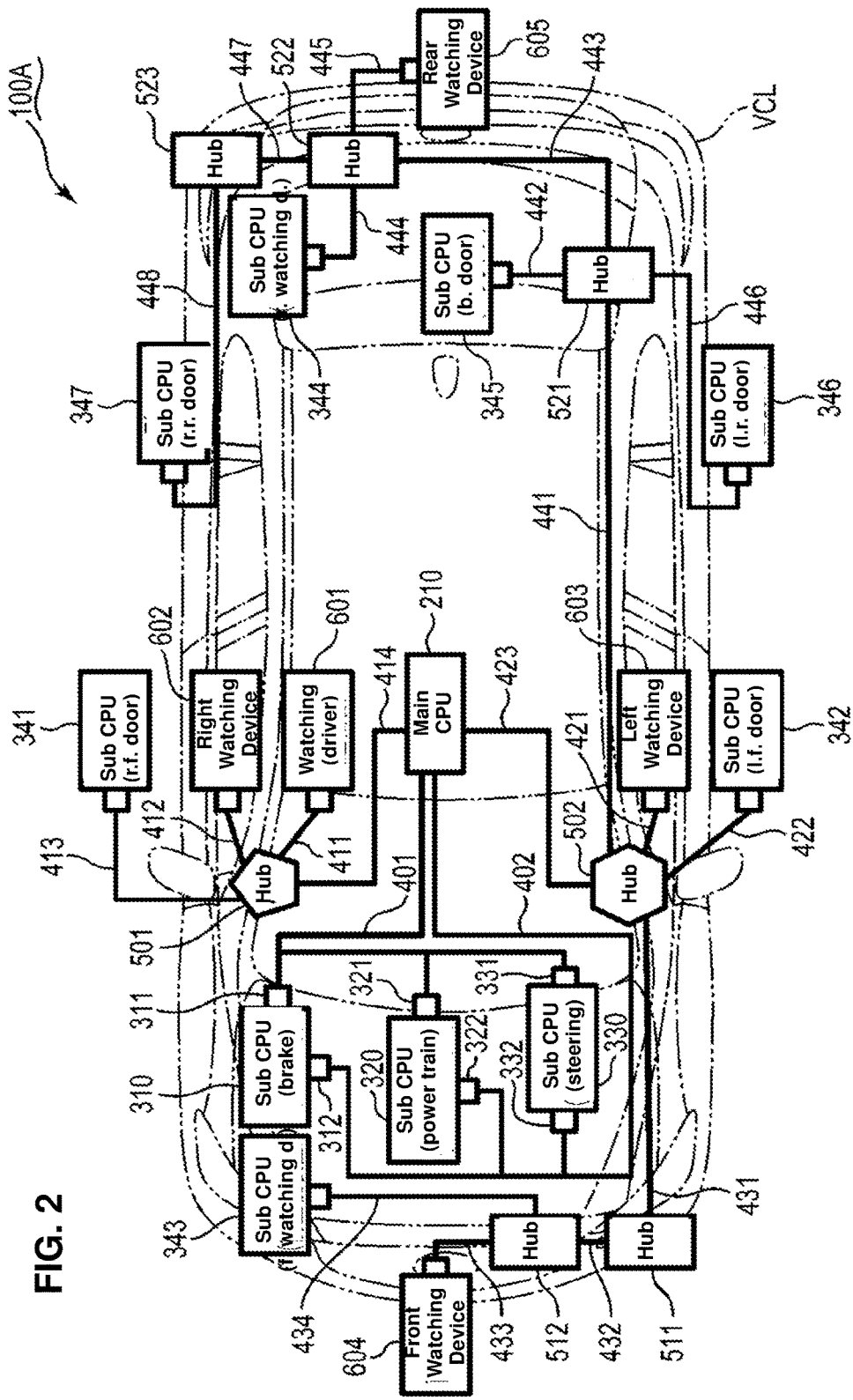
FIG. 2 is a conceptual block diagram of a wire harness arrangement structure of a second embodiment.

FIG. 2 is a conceptual block diagram of a wire harness arrangement structure of the second embodiment (hereafter, referred to as an arrangement structure 100A). The arrangement structure 100A will be described referring to FIGS. 1 and 2.

The arrangement structure 100A comprises a main CPU 210, sub CPUs 310, 320, 330, a first signal transmission route 401, and a second signal transmission route 402. The main CPU corresponds to the main control part 110 described referring to FIG. 1. The description of the main control part 110 may be applied to the main CPU 210.

The sub CPU 310 which is arranged on the right of the sub CPU 320 controls the brake (not illustrated) which is installed to a vehicle VCL. The sub CPU 310 corresponds to at least one of the component control parts 121, 122, 123, 124 described referring to FIG. 1. The descriptions of the component control parts 121, 122, 123, 124 may be applied to the sub CPU 310.

The sub CPU 320 which is arranged between the sub CPUs 310, 320 controls a power train (the engine or the transmission, not illustrated) which is installed to the vehicle VCL. The sub CPU 320 corresponds to at least one of the component control parts 121, 122, 123, 124 described referring to FIG. 1. The descriptions of the component control parts 121, 122, 123, 124 may be applied to the sub CPU 320.

The sub CPU 330 which is arranged on the left of the sub CPU 320 controls the steering (not illustrated) which is installed to the vehicle VCL. The sub CPU 330 corresponds to at least one of the component control parts 121, 122, 123, 124 described referring to FIG. 1. The descriptions of the component control parts 121, 122, 123, 124 may be applied to the sub CPU 330.

The first signal transmission route 401 is made of one or plural wire harnesses. The second signal transmission route 402 is made of one or plural wire harnesses.

The sub CPU 310 includes plural terminals 311, 312. The sub CPU 320 includes plural terminals 321, 322. The sub CPU 330 includes plural terminals 331, 332. The first signal transmission route 401 extends from the main CPU 210 and is connected to the terminals 311, 321, 331. The second signal transmission route 402 extends from the main CPU 210 and is connected to the terminals 312, 322, 332. Accordingly, the command signals generated by the main CPU 210 are respectively transmitted to the sub CPUs 310, 320, 330 through the first signal transmission route 401 and/or the second signal transmission route 402. Accordingly, even if either one of the first signal transmission route 401 and the second signal transmission route 402 is shut down, the command signals can be transmitted to the sub CPUs 310, 320, 330 through the other one of the first signal transmission route 401 and the second signal transmission route 402.

The arrangement structure 100A comprises a watching (monitoring) device 601, a right watching (monitoring) device 602, a sub CPU 341, wire harnesses 411, 412, 413, 414, and a hub 501. The wire harness 414 extends from the main CPU 210 to the hub 501. The wire harness 411 extends between the watching device 601 and the hub 501 and constitutes a signal transmission line (i.e., a single-line signal transmission route). The wire harness 412 extends between the right watching device 602 and the hub 501 and constitutes another signal transmission line. The wire harness 413 extends between the sub CPU 341 and the hub 501 and constitutes further another signal transmission line.

The watching device 601 may be any device to monitor a driver. For example, the watching device 601 may be a camera device to watch (monitor) a position of a driver's pupil. Alternatively, the watching device 601 may be a camera device to watch a driving position of the driver. Further, the watching device 601 may be a weight measuring device to watch a change of a position a driver's gravity center in place. The doctrine of the present embodiment is not limited to a particular device used as the watching device 601.

The watching device 601 generates a signal for representing a state of the driver. The signal is transmitted to the main CPU 210 through the wire harnesses 411, 414 and the hub 501. The main CPU 210 may generate the command signal based on the signal generated by the watching device 601. If the signal generated by the watching device 601 represents a problem (a poor physical condition, for example) of the driver, the main CPU 210 generates the command signal to command a speed reduction of the vehicle VCL. The command signal is transmitted to the sub CPUs 310, 320 with high reliability as described above. Consequently, the sub CPU 310 controls the brake so that the braking force can be increased. The sub CPU 320 controls the power train so that the speed can be decreased.

The right watching device 602 may be a device to monitor a state of a right side of the vehicle VCL. For example, the right watching device 602 may be a camera device to pick up an image on the right side of the vehicle VCL. Alternatively, the right watching device 602 may be a sensor which radiates a light beam toward the right side of the vehicle VCL and detects existence/nonexistence of an obstacle based on reflection of this light beam. The doctrine of the present embodiment is not limited to a particular device used as the right watching device 602.

The right watching device 602 generates a signal for representing a right-side state of the vehicle VCL. The signal is transmitted to the main CPU 210 through the wire harnesses 412, 414 and the hub 501. The main CPU 210 may generate the command signal based on the signal generated by the right watching device 602. The command signal is transmitted to the sub CPUs 330, 320, 310 with high reliability as described above. Consequently, in a case where the signal generated by the right watching device 602 represents an obstacle existing on the right side of the vehicle VCL, the sub CPU 330 controls the steering so that any collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 341 may control a right front door of the vehicle VCL. For example, the sub CPU 341 may move a window of the right front door vertically. The sub CPU 341 may control a lock of the right front door. When the driver operates an operational switch (not illustrated) installed to the vehicle VCL to command the window of the right front door to lower, the main CPU 210 generates the command signal to command lowering of the window of the right front door. The command signal is transmitted to the sub CPU 341 through the wire harnesses 414, 413 and the hub 501. The sub CPU 341 moves the widow of the right front door downward in accordance with the command signal.

The arrangement structure 100A comprises a left watching (monitoring) device 603, a sub CPU 342, wire harnesses 421, 422, 423, 414, and a hub 502. The wire harness 423 extends from the main CPU 210 and is connected to the hub 502. The wire harness 421 extends between the left watching device 603 and the hub 502 and constitutes a signal transmission line. The wire harness 422 extends between the sub CPU 342 and the hub 502 and constitutes another signal transmission line.

The left watching device 603 may be a device to monitor a state of a left side of the vehicle VCL. For example, the left watching device 603 may be a camera device to pick up an image on the left side of the vehicle VCL. Alternatively, the left watching device 603 may be a sensor which radiates a light beam toward the left side of the vehicle VCL and detects existence/nonexistence of an obstacle based on reflection of this light beam. The doctrine of the present embodiment is not limited to a particular device used as the left watching device 603.

The left watching device 603 generates a signal for representing a left-side state of the vehicle VCL. The signal is transmitted to the main CPU 210 through the wire harnesses 421, 423 and the hub 502. The main CPU 210 may generate the command signal based on the signal generated by the left watching device 603. The command signal is transmitted to the sub CPUs 330, 320, 310 with high reliability as described above. Consequently, in a case where the signal generated by the left watching device 603 represents an obstacle existing on the left side of the vehicle VCL, the sub CPU 330 controls the steering so that any collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 342 may control a left front door of the vehicle VCL. For example, the sub CPU 342 may move a window of the left front door vertically. The sub CPU 342 may control a lock of the left front door. When the driver operates an operational switch (not illustrated) installed to the vehicle VCL to command the window of the left front door to lower, the main CPU 210 generates the command signal to command lowering of the window of the left front door. The command signal is transmitted to the sub CPU 342 through the wire harnesses 423, 422 and the hub 502. The sub CPU 342 moves the widow of the left front door downward in accordance with the command signal.

The arrangement structure 100A comprises a front watching device 604, a sub CPU 343, hubs 511, 512, and wire harnesses 431, 432, 433, 434. The wire harness 431 extends between the hubs 502, 511. The wire harness 432 extends between the hubs 511, 512. The wire harness 433 extends between the hub 512 and the front watching device 604. The wire harnesses 431, 432, 433 and the hubs 511, 512 constitute a signal transmission line. The wire harness 434 extends between the hub 512 and the sub CPU 343. The wire harnesses 431, 432, 434 and the hubs 511, 512 constitute another signal transmission line.

The front watching device 604 may be a device to monitor a state of a front side of the vehicle VCL. For example, the front watching device 604 may be a camera device to pick up an image on the front side of the vehicle VCL. Alternatively, the front watching device 604 may be a sensor which radiates a light beam toward the front side of the vehicle VCL and detects existence/nonexistence of an obstacle based on reflection of this light beam. The doctrine of the present embodiment is not limited to a particular device used as the front watching device 604.

In a case where the front watching device 604 is a camera device, image data generated by the camera device may be transmitted to the sub CPU 343 through the wire harnesses 433, 434. The sub CPU 343 may analyze the image data and determine existence/nonexistence of the obstacle. A signal representing this determination result may be transmitted to the main CPU 210 from the sub CPU 343 through the wire harnesses 434, 432, 431, 423 and the hubs 512, 511, 502. The main CPU 210 may generate the command signal based on the signal representing the determination result. The command signal is transmitted to the sub CPUs 330, 320, 310 with high reliability as described above. Consequently, in a case where the signal representing the determination result represents the existence of the obstacle on the front side of the vehicle VCL, the sub CPU 330 controls the steering so that collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 343 may control the front watching device 604. For example, the sub CPU 343 may control a watching direction of the camera device used as the front watching device 604. Alternatively, the sub CPU 343 may control a light-beam radiation direction of the sensor used as the front watching device 604.

The arrangement structure 100A comprises a rear watching device 605, sub CPUs 344, 345, hubs 521, 522, and wire harnesses 441, 442, 443, 444, 445. The wire harness 441 extends between the hubs 502, 521. The wire harness 442 extends between the hub 521 and the sub CPU 345. The wire harnesses 441, 442 and the hub 521 constitute a signal transmission line.

The sub CPU 345 may control a back door of the vehicle VCL. For example, the sub CPU 345 may control a lock of the back door. When the driver operates an operational switch (not illustrated) installed to the vehicle VCL to command the back door to be released, the main CPU 210 generates the command signal to command releasing of the back door. The command signal is transmitted to the sub CPU 345 through the wire harnesses 423, 441, 442 and the hubs 502, 521. The sub CPU 345 releases the lock of the back door in accordance with the command signal.

The wire harness 443 extends between the hubs 521, 522. The wire harness 445 extends between the hub 522 and the rear watching device 605. The wire harnesses 441, 443, 445 and the hubs 521, 522 constitute a signal transmission line.

The front watching device 605 may be a device to monitor a state of a rear side of the vehicle VCL. For example, the rear watching device 605 may be a camera device to pick up an image on the rear side of the vehicle VCL. Alternatively, the rear watching device 605 may be a sensor which radiates a light beam toward the rear side of the vehicle VCL and detects existence/nonexistence of an obstacle based on reflection of this light beam. The doctrine of the present embodiment is not limited to a particular device used as the rear watching device 605.

The wire harness 444 extends between the hub 522 and the sub CPU 344. The wire harnesses 441, 443, 444 and the hubs 521, 522 constitute a signal transmission line.

In a case where the front watching device 605 is a camera device, image data generated by the camera device may be transmitted to the sub CPU 344 through the wire harnesses 445, 444 and the hub 522. The sub CPU 344 may analyze the image data and determine existence/nonexistence of the obstacle. A signal representing this determination result may be transmitted to the main CPU 210 from the sub CPU 344 through the wire harnesses 444, 443, 441, 423 and the hubs 522, 521, 502. The main CPU 210 may generate the command signal based on the signal representing the determination result. The command signal is transmitted to the sub CPUs 330, 320, 310 with high reliability as described above. Consequently, in a case where the signal representing the determination result represents the existence of the obstacle on the rear side of the vehicle VCL, the sub CPU 330 controls the steering so that any collision of the vehicle VCL with the obstacle can be avoided. The sub CPU 320 may control the powertrain in accordance with the command signal so that the speed of the vehicle VCL can be decreased if necessary. Additionally, the sub CPU 310 may control the brake in accordance with the command signal so that the braking force is applied to the vehicle VCL.

The sub CPU 344 may control the rear watching device 605. For example, the sub CPU 344 may control a watching direction of the camera device used as the rear watching device 604. Alternatively, the sub CPU 344 may control a light-beam radiation direction of the sensor used as the rear watching device 605.

The arrangement structure 100A comprises sub CPUs 346, 347, a hub 523, and wire harnesses 446, 447, 448. The wire harness 446 extends between the hub 521 and the sub CPU 346 and constitutes a signal transmission line.

The sub CPU 346 may control a left rear door of the vehicle VCL. For example, the sub CPU 346 may move a window of the left rear door vertically. The sub CPU 346 may control a lock of the left rear door. When the driver operates an operational switch (not illustrated) installed to the vehicle VCL to command the window of the left rear door to lower, the main CPU 210 generates the command signal to command lowering of the window of the left rear door. The command signal is transmitted to the sub CPU 346 through the wire harnesses 423, 441, 446 and the hubs 502, 521. The sub CPU 346 moves the widow of the left rear door downward in accordance with the command signal.

The wire harness 447 extends between the hubs 522, 523. The wire harness 448 extends between the hub 523 and the sub CPU 347. The wire harnesses 447, 448 and the hub 523 constitute a signal transmission line.

The sub CPU 347 may control a right rear door of the vehicle VCL. For example, the sub CPU 347 may move a window of the right rear door vertically. The sub CPU 347 may control a lock of the right rear door. When the driver operates an operational switch (not illustrated) installed to the vehicle VCL to command the window of the right rear door to lower, the main CPU 210 generates the command signal to command lowering of the window of the right rear door. The command signal is transmitted to the sub CPU 347 through the wire harnesses 423, 441, 443, 447, 448 and the hubs 502, 521, 522, 523. The sub CPU 347 moves the widow of the right rear door downward in accordance with the command signal.

As shown in FIG. 2, the plural-line signal transmission structure (i.e., the signal transmission structure comprising the first signal transmission route 401 and the second signal transmission route 402) is used only for signal transmitting to the sub CPUs 310, 320, 330. The other sub CPUs 341-347 perform communication with the main CPU 210 through the single-line signal transmission route. Accordingly, the gross weight of the wire harnesses installed to the vehicle VCL does not become excessively large. In the present embodiment, the sub control part is exemplified by one of the sub CPUs 341-347.

The signal transmission route shown in FIG. 2 may be designed based on a network technology, such as CAN (Control Area Network) or CAN FD (CAN with Flexible Date Rate).

Embodiment 3

Designers can design various wire harness arrangement structures based on the design doctrine described relating to the above-described embodiments. In a third embodiment, an exemplified arrangement structure of the wire harness will be described.

Figure 3:
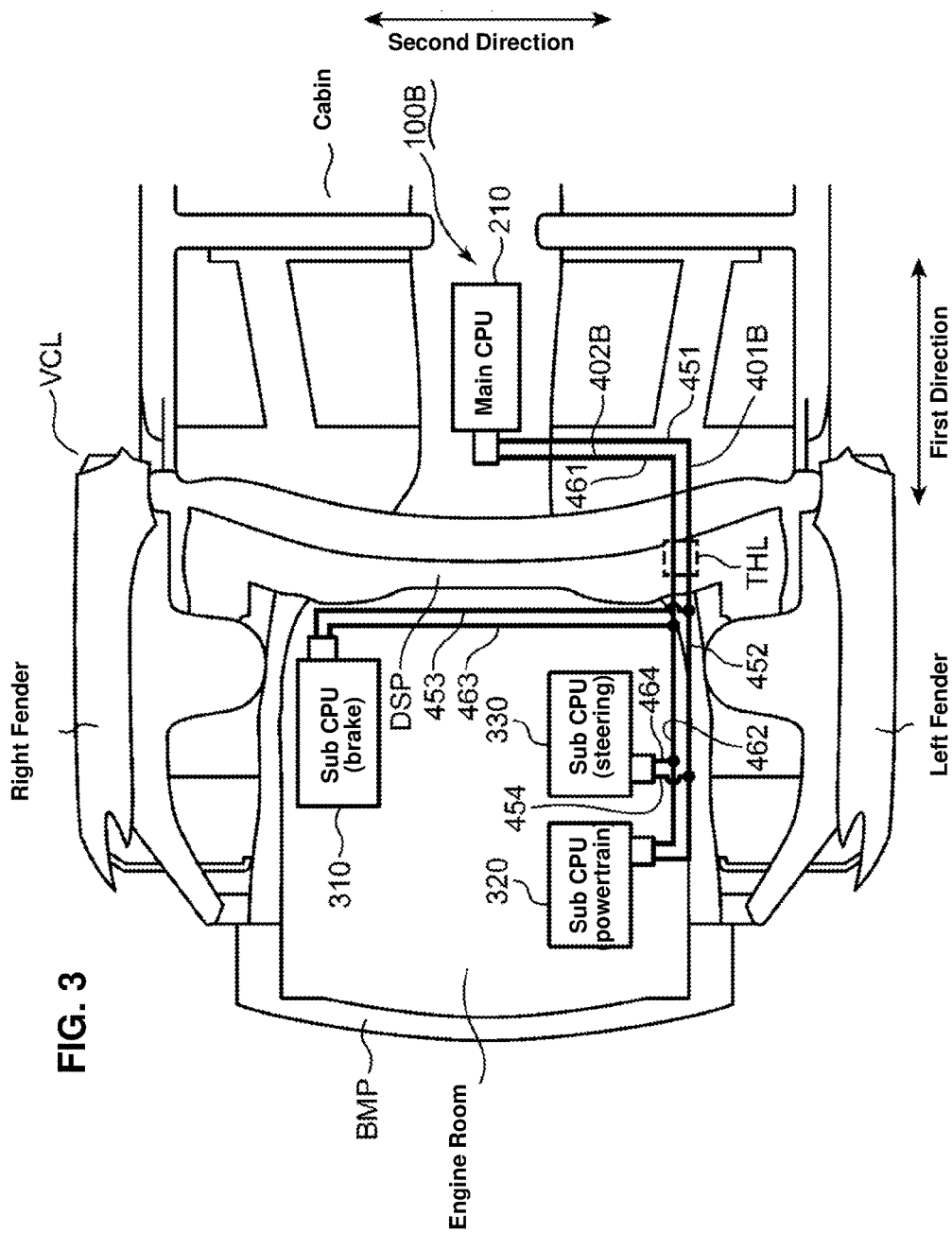
FIG. 3 is a conceptual block diagram of a wire harness arrangement structure of a third embodiment.

FIG. 3 is a conceptual block diagram of the wire harness arrangement structure (hereafter, referred to as an arrangement structure 100B) of the third embodiment. The arrangement structure 100B will be described referring to FIG. 3. The descriptions of the above-described embodiments are applied to elements of the third embodiment which are denoted by the same reference characters as the above-described embodiments.

FIG. 3 is a schematic plan view of the vehicle VCL. The vehicle VCL includes a bumper BMP and a dash panel DSP. The bumper BMP forms a front end of the vehicle VCL. The dash panel DSP partitions a space inside the vehicle VCL into an engine room and a cabin. The engine room is formed between the dash panel DSP and the bumper BMP. The cabin is formed in back of the dash panel DSP.

The arrangement structure 100B comprises the main CPU 20 and the sub CPUs 310, 320, 330 similarly to the second embodiment. The description of the second embodiment is applied to these elements.

The sub CPUs 310, 320, 330 are arranged in the engine room, and the main CPU 210 is arranged in the cabin. Since the cabin is designed to protect the driver, it is configured to be harder than the engine room. Accordingly, the main CPU 210 is protected properly from the collision of the vehicle VCL with the obstacle.

The arrangement structure 100B further comprises a first signal transmission route 401B and a second signal transmission route 402B. The first signal transmission route 401B is made of one or plural wire harnesses. The second signal transmission route 402B is made of one or plural wire harnesses. Since the sub CPUs 310, 320, 330 are electrically connected to the main CPU 210 by the first signal transmission route 401B and the second signal transmission route 402B, the communication of the sub CPUs 310, 320, 330 with the main CPU 210 is maintained properly under the collision of the vehicle VCL with the obstacle.

The dash panel DSP has a penetration hole THL. The penetration hole THL is formed at a position which is closer to a left fender enclosing a left front wheel than a right fender enclosing a right front wheel. The sub CPU 310 is positioned more closely to the right fender than the sub CPUs 320, 330. The sub CPUs 320, 330 are positioned more closely to the left fender than the sub CPU 310. The first signal transmission route 401B and the second signal transmission route 402B electrically connect the main CPU 210 and the sub CPUs 310, 320, 330 through the penetration hole THL.

The first signal transmission route 401B includes transmission paths 451, 452, 453, 454. The second signal transmission route 402B includes transmission paths 461, 462, 463, 464. In the following description, a direction directed from the dash panel DSP toward the bumper BMP (i.e., a traveling direction of the advancing vehicle VCL) or its reverse direction will be referred to as a "first direction." A direction perpendicular to the first direction (i.e., a vehicle width direction) will be referred to as a "second direction."

The transmission paths 451, 461 extend leftward (i.e., the second direction) from the main CPU 210. The transmission path 452 is bent forward (i.e., the first direction) from a left end of the transmission path 451 and passes through the penetration hole THL. The transmission path 452 extends along the left fender and is connected to the sub CPU 320 arranged between the sub CPU 330 and the bumper BMP. The transmission path 462 is bent forward (i.e., the first direction) from a left end of the transmission path 461 and passes through the penetration hole THL. The transmission path 462 extends along the left fender and is connected to the sub CPU 320.

The transmission path 453 is branched from the transmission path 452 at a position located just in front of the penetration hole THL and extends rightward (i.e., the second direction). The transmission path 453 extends along the dash panel DSP and is connected to the sub CPU 310. The transmission path 463 is branched from the transmission path 462 at a position located just in front of the penetration hole THL and extends rightward. The transmission path 463 extends along the dash panel DSP and is connected to the sub CPU 310.

The transmission path 454 is branched from the transmission path 452 at a position which is further from the penetration hole THL than the transmission path 453 and extends rightward. The transmission path 453 is connected to the sub CPU 330. The transmission path 464 is branched from the transmission path 462 at a position which is further from the penetration hole THL than the transmission path 463 and extends rightward. The transmission path 463 is connected to the sub CPU 330.

Embodiment 4

A signal transmission loop described relating to the third embodiment includes two transmission paths which extend in the first direction over a long range at a position located near the left fender. Accordingly, there may be a case where the two transmission paths get broken at the same time when the left fender of the vehicle collides with an obstacle. In a fourth embodiment, an exemplified arrangement structure of the wire harness which can maintain the high reliability of the signal transmission performance even under the vehicle side collision will be described.

Figure 4:
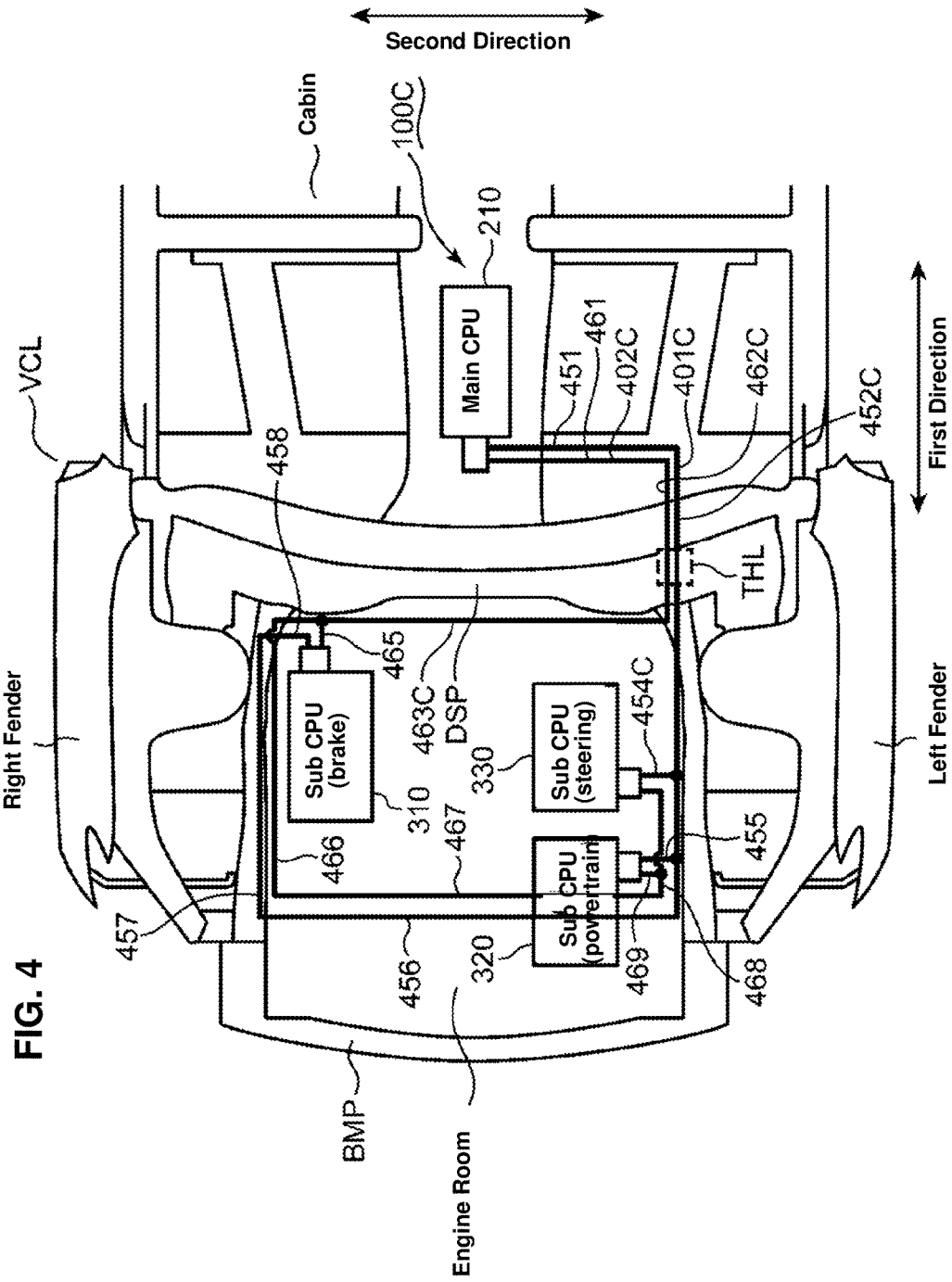
FIG. 4 is a conceptual block diagram of a wire harness arrangement structure of a fourth embodiment.

FIG. 4 is a conceptual block diagram of the wire harness arrangement structure (hereafter, referred to as an arrangement structure 100C) of the fourth embodiment. The arrangement structure 100C will be described referring to FIG. 4. The descriptions of the above-described embodiments are applied to elements of the fourth embodiment which are denoted by the same reference characters as the above-described embodiments.

The arrangement structure 100C comprises the main CPU 20 and the sub CPUs 310, 320, 330 similarly to the second embodiment. The description of the second embodiment is applied to these elements.

The arrangement structure 100C includes a first signal transmission route 401C and a second signal transmission route 402C. Similarly to the third embodiment, the first signal transmission route 401C includes the transmission path 451. The second signal transmission route 402C includes a transmission path 461. The description of the third embodiment is applied to the transmission paths 451, 461.

The first signal transmission route 401C includes transmission paths 452C, 454C, 455, 456, 457, 458. The transmission path 452C extends forward (i.e., the first direction) from a left end of the transmission path 452C and passes through the penetration hole THL. The transmission path 452C extends forward along the left fender. The transmission path 454C is branched rightward (i.e., the second direction) from the transmission path 452C and is connected to the sub CPU 310. The transmission path 455 is branched rightward from the transmission path 452C at a position which is further from the penetration hole THL than the transmission path 454C and is connected to the sub CPU 320. In the present embodiment, the first transmission path is exemplified by the transmission path 452C.

The transmission path 456 extends rightward from a front end of the transmission path 452C. The transmission path 456 extends to a position located near the right fender so as to overlap the sub CPU 320. The transmission path 457 extends rearward (i.e., the first direction) from a right end of the transmission path 456. The transmission path 457 extends along the right fender to a position located near the dash panel DSP. The transmission path 458 extends leftward (i.e., the second direction) from a rear end of the transmission path 457 and is connected to the sub CPU 310.

The second signal transmission route 402C includes transmission paths 462C, 463C, 465, 466, 467, 468, 469. The transmission path 462C extends forward from a left end of the transmission path 461 and passes through the penetration hole THL. The transmission path 463C extends rightward from a front end of the transmission path 462 at a positon located in front of the penetration hole THL. The transmission path 463C extends along the dash panel DSP and extends to a position located near the right fender. The transmission path 465 is branched forward from the transmission path 463C and is connected to the sub CPU 310. The transmission path 466 extends forward from a right end of the transmission path 463. The sub CPUs 310, 320, 330 are arranged between the transmission paths 452C, 466. Since the transmission path 466 extends along the right fender at the position located rightward largely far from the transmission path 452C, it is difficult that the transmission paths 452C, 466 get broken at the same time. Even if either one of the first signal transmission route 401C and the second signal transmission route 402C is broken under a light collision where the sub CPUs 310, 320, 330 do not get broken, the signal transmission performance is maintained. Accordingly, the vehicle VCL can maintain the basic performances (i.e., "proceeding," "retreating," "curving," and/ or "stopping"). In the present embodiment, the second transmission path is exemplified by the transmission path 466.

The transmission path 467 extends leftward (i.e., the second direction) from a front end of the transmission path 466. The transmission path 467 extends to a position located near the left fender so as to overlap the sub CPU 320. The transmission path 468 extends rearward from a left end of the transmission path 467 and is connected to the sub CPU 330. The transmission path 469 is branched leftward from the transmission path 468 and is connected to the sub CPU 320.

Embodiment 5

Designers can design another arrangement structure based on the design doctrine of the third embodiment and the fourth embodiment. In a fifth embodiment, an exemplified arrangement structure of the wire harness will be described.

Figure 5:
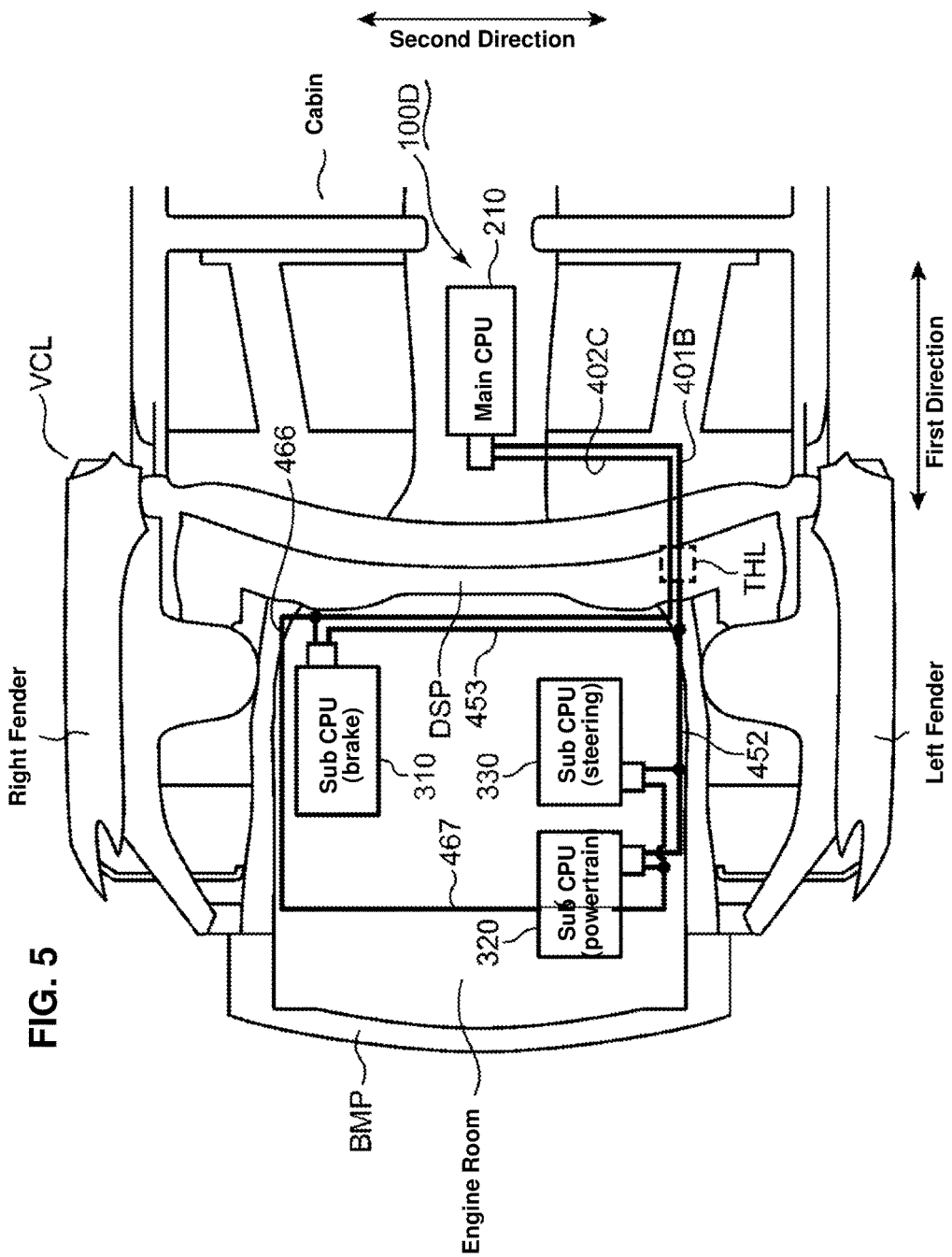
FIG. 5 is a conceptual block diagram of a wire harness arrangement structure of a fifth embodiment.

FIG. 5 is a conceptual block diagram of the wire harness arrangement structure (hereafter, referred to as an arrangement structure 100D) of the fifth embodiment. The arrangement structure 100D will be described referring to FIG. 5. The descriptions of the above-described embodiments are applied to elements of the fifth embodiment which are denoted by the same reference characters as the above-described embodiments.

The arrangement structure 100D comprises the main CPU 210 and the sub CPUs 310, 320, 330 similarly to the second embodiment. The description of the second embodiment is applied to these elements.

The arrangement structure 100D further comprises the first signal transmission route 401B similarly to the third embodiment. The description of the third embodiment is applied to this first signal transmission route 401B.

The arrangement structure 100D further comprises the second signal transmission route 402C similarly to the fourth embodiment. The description of the fourth embodiment is applied to this second signal transmission route 402C.

The sub CPUs 310, 320, 330 are arranged between the transmission path 452 of the first signal transmission route 401B and the transmission path 466 of the second signal transmission route 402C. Since the transmission path 452 is largely far from the transmission path 466 in the second direction, it is difficult that the transmission paths 452, 466 get broken at the same time. The sub CPUs 310, 330 are arranged between the transmission path 453 of the first signal transmission route 401B and the transmission path 467 of the second signal transmission route 402C. Since the transmission path 453 is largely far from the transmission path 467 in the second direction, it is difficult that the transmission paths 453, 467 get broken at the same time. Even if either one of the first signal transmission route 401B and the second signal transmission route 402C is broken under the light collision where the sub CPUs 310, 320, 330 do not get broken, the signal transmission performance is maintained. Accordingly, the vehicle VCL can maintain the basic performances (i.e., "proceeding," "retreating," "curving," and/or "stopping"). In the present embodiment, the third transmission path is exemplified by the transmission path 453. The fourth transmission path is exemplified by the transmission path 467.

Embodiment 6

According to the design doctrine described relating to the third embodiment and the fifth embodiment, the two wire harnesses extending from the main CPU extend in parallel. Accordingly, when the vehicle left-side face collision occurs, there may be a case where these wire harnesses get broken at the same time. In the sixth embodiment, an improved arrangement structure will be described.

Figure 6:
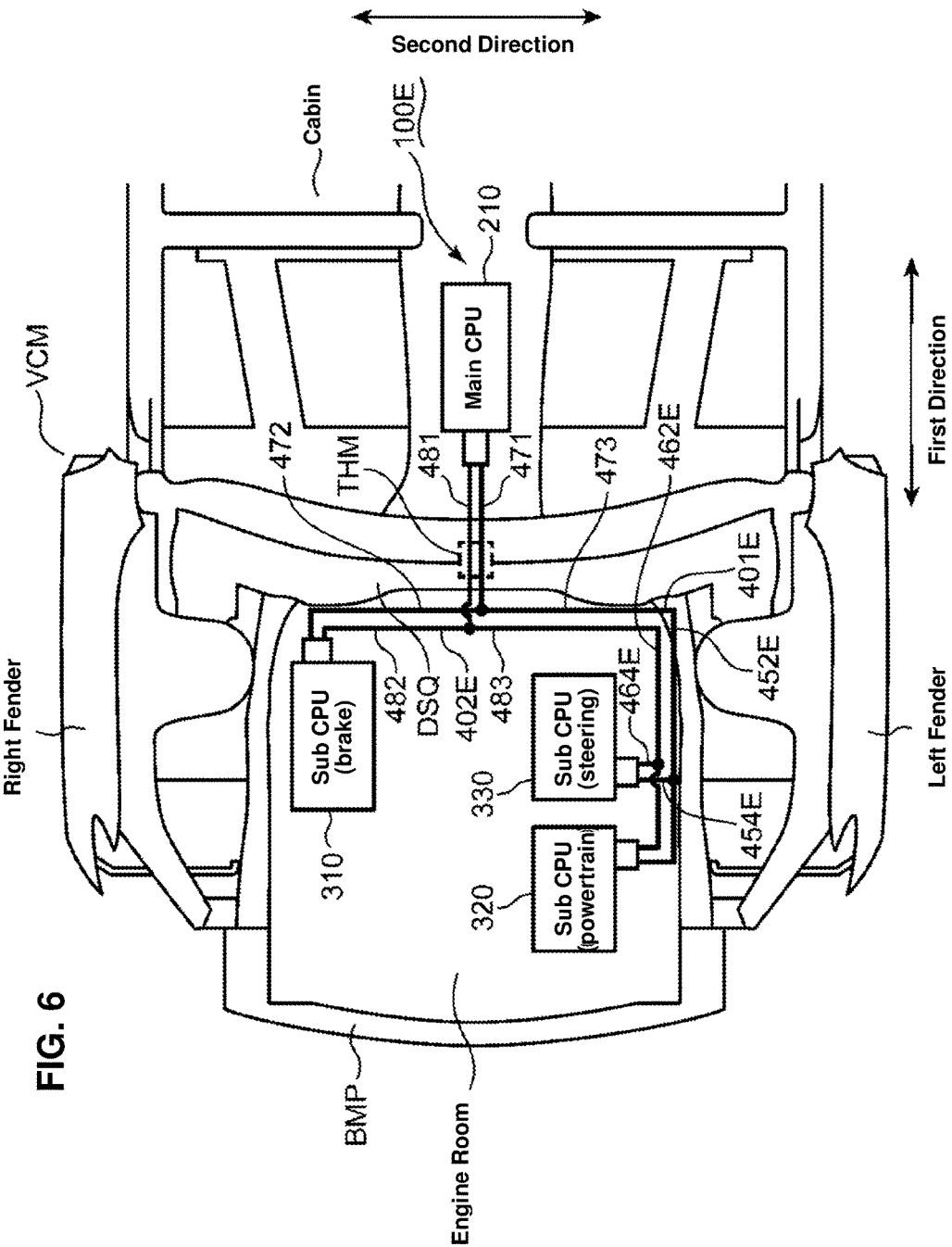
FIG. 6 is a conceptual block diagram of a wire harness arrangement structure of a sixth embodiment.

FIG. 6 is a conceptual block diagram of the wire harness arrangement structure (hereafter, referred to as an arrangement structure 100E) of the sixth embodiment. The arrangement structure 100E will be described referring to FIG. 6. The descriptions of the above-described embodiments are applied to elements of the sixth embodiment which are denoted by the same reference characters as the above-described embodiments.

FIG. 6 is a schematic plan view of a vehicle VCM. The vehicle VCM includes the bumper BMP similarly to the third embodiment. The description of the third embodiment is applied this bumper BMP.

The vehicle VCM includes a dash panel DSQ. The dash panel DSQ partitions a space inside the vehicle VCM into an engine room and a cabin. The engine room is formed between the dash panel DSQ and the bumper BMP. The cabin is formed in back of the dash panel DSQ.

The dash panel DSQ has a penetration hole THM. The penetration hole THM is formed at a central portion, in the vehicle width direction (i.e., the second direction), of the dash panel DSQ, which is different from the third embodiment. The penetration hole THM is positioned in front of the main CPU 210.

The arrangement structure 100E comprises the main CPU 210 and the sub CPUs 310, 320, 330 similarly to the second embodiment. The description of the second embodiment is applied to these elements.

The arrangement structure 100E further comprises a first signal transmission route 401E and a second signal transmission route 402E. The first signal transmission route 401E includes transmission paths 471, 472, 473, 452E, 454E. The second signal transmission route 402E includes transmission paths 481, 482, 483, 462E, 464E.

The transmission paths 471, 481 extend forward (i.e., the first direction) from the main CPU 210 and pass through the penetration hole THM. The transmission path 472 extends rightward (i.e., the second direction) from a front end of the transmission path 471 along the dash panel DSQ at a position located in front of the penetration hole THM and is connected to the sub CPU 310. The transmission path 482 extends rightward from a front end of the transmission path 481 along the dash panel DSQ at a position located in front of the penetration hole THM and is connected to the sub CPU 310. The transmission path 473 extends leftward (i.e., the second direction) from a front end of the transmission path 471 at a position located in front of the penetration hole THM. The transmission path 473 extends to a position located near the left fender along the dash panel DSQ. The transmission path 483 extends leftward from the front end of the transmission path 481 at a position located in front of the penetration hole THM. The transmission path 483 extends to a position located near the left fender along the dash panel DSQ.

The transmission path 452E extends forward from a left end of the transmission path 473 along the left fender and is connected to the sub CPU 320. The transmission path 462E extends forward from a left end of the transmission path 483 along the left fender and is connected to the sub CPU 320. The transmission path 454E is branched rightward from the transmission path 452E and is connected to the sub CPU 330. The transmission path 464E is branched rightward from the transmission path 462E and is connected to the sub CPU 330.

Embodiment 7

A signal transmission loop described relating to the sixth embodiment includes two transmission paths which extend in the first direction over a long range at a position located near the left fender. Accordingly, there may be a case where the two transmission paths get broken at the same time when the left fender of the vehicle collides with an obstacle. In a seventh embodiment, an exemplified arrangement structure of the wire harness which can maintain the high reliability of the signal transmission performance even under the vehicle side collision will be described.

Figure 7:
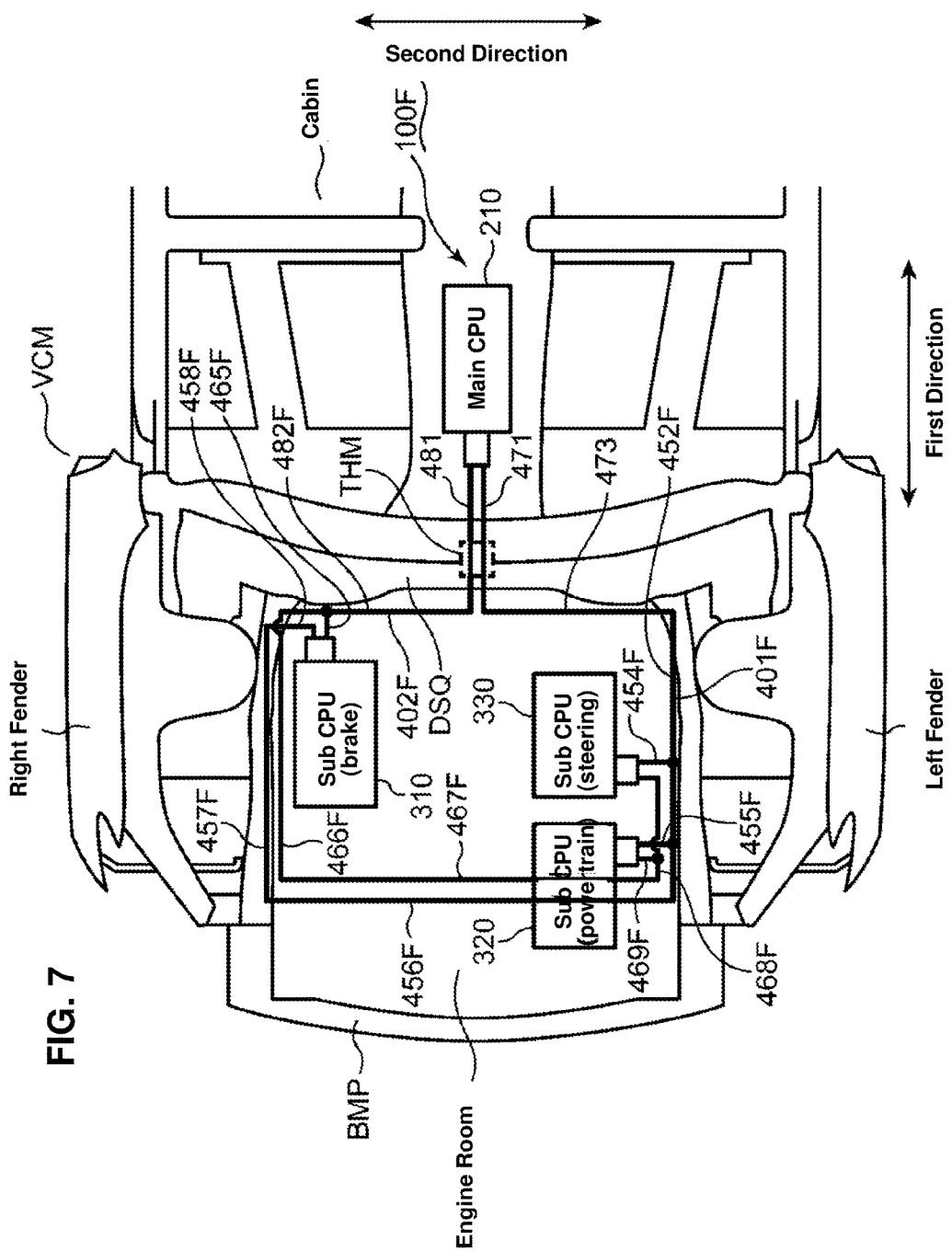
FIG. 7 is a conceptual block diagram of a wire harness arrangement structure of a seventh embodiment.

FIG. 7 is a conceptual block diagram of the wire harness arrangement structure (hereafter, referred to as an arrangement structure 100F) of the seventh embodiment. The arrangement structure 100F will be described referring to FIG. 7. The descriptions of the above-described embodiments are applied to elements of the seventh embodiment which are denoted by the same reference characters as the above-described embodiments.

The arrangement structure 100F is installed to the vehicle VCM similarly to the sixth embodiment. The description of the sixth embodiment is applied to the vehicle VCM.

The arrangement structure 100F comprises the main CPU 210 and the sub CPUs 310, 320, 330 similarly to the second embodiment. The description of the second embodiment is applied to these elements.

The arrangement structure 100F comprises a first signal transmission route 401F and a second signal transmission route 402F. Similarly to the sixth embodiment, the first signal transmission route 401F includes the transmission paths 471, 473. The second signal transmission route 402F includes the transmission path 481. The description of the sixth embodiment is applied to the transmission paths 471, 473, 481.

The first signal transmission route 401F includes transmission paths 452F, 454F, 455F, 456F, 457F, 458F. The transmission path 452F extends forward (i.e., the first direction) from a left end of the transmission path 473 along the left fender. The transmission path 454F is branched rightward (i.e., the second direction) from the transmission path 452C and is connected to the sub CPU 330. The transmission path 455F is branched rightward from the transmission path 452F at a position which is further from the dash panel DSQ than the transmission path 454F and is connected to the sub CPU 320.

The transmission path 456F extends rightward from a front end of the transmission path 452F. The transmission path 456F extends to a position located near the right fender so as to overlap the sub CPU 320. The transmission path 457F extends along the right fender to a position located near the dash panel DSQ. The transmission path 458F extends leftward (i.e., the second direction) from a rear end of the transmission path 457F and is connected to the sub CPU 310.

The second signal transmission route 402F includes transmission paths 465F, 466F, 467F, 468F, 469F, 482F. The transmission path 482F extends rightward from a left end of the transmission path 481. The transmission path 482F extends along the dash panel DSP to a position located near the right fender. The transmission path 465F is branched forward from the transmission path 482F and is connected to the sub CPU 310. The transmission path 466F extends forward from a right end of the transmission path 482F. The sub CPUs 310, 320, 330 are arranged between the transmission paths 452F, 466F. Since the transmission path 466F extends along the right fender at the position located rightward largely far from the transmission path 452F, it is difficult that the transmission paths 452F, 466F get broken at the same time. Even if either one of the first signal transmission route 401F and the second signal transmission route 402F is broken under the light collision where the sub CPUs 310, 320, 330 do not get broken, the signal transmission performance is maintained. Accordingly, the vehicle VCM can maintain the basic performances (i.e., "proceeding," "retreating," "curving," and/or "stopping").

The transmission path 467F extends leftward (i.e., the second direction) from a front end of the transmission path 466F. The transmission path 467F extends to a position located near the left fender so as to overlap the sub CPU 320. The transmission path 468F extends rearward from a left end of the transmission path 467F. The transmission path 469F is branched leftward from the transmission path 468F and is connected to the sub CPU 320.

Embodiment 8

Designers can design another arrangement structure based on the design doctrine of the sixth embodiment and the seventh embodiment. In an eighth embodiment, an exemplified arrangement structure of the wire harness will be described.

Figure 8:
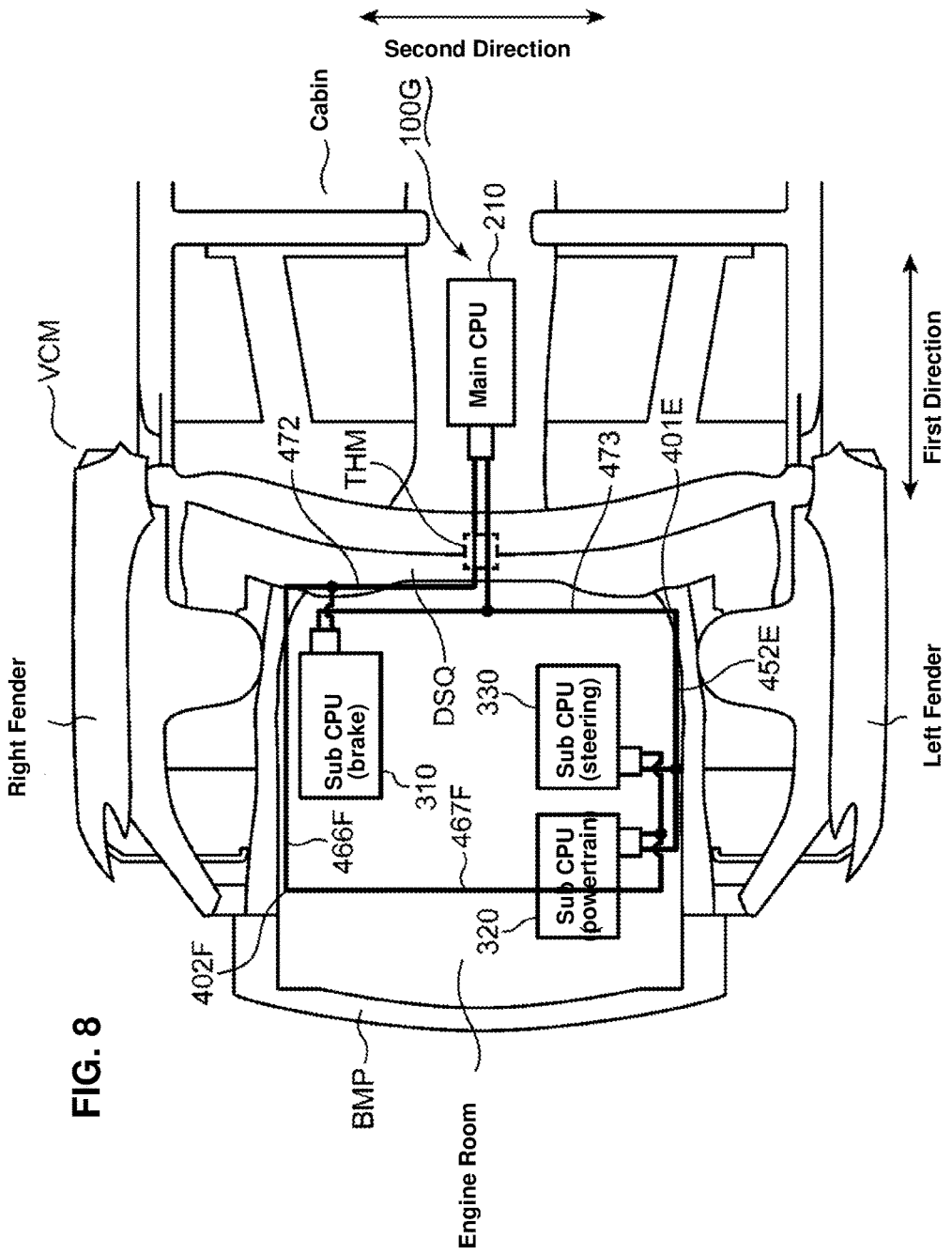
FIG. 8 is a conceptual block diagram of a wire harness arrangement structure of am eighth embodiment.

FIG. 8 is a conceptual block diagram of the wire harness arrangement structure (hereafter, referred to as an arrangement structure 100G) of the eighth embodiment. The arrangement structure 100G will be described referring to FIG. 8. The descriptions of the above-described embodiments are applied to elements of the eighth embodiment which are denoted by the same reference characters as the above-described embodiments.

The arrangement structure 100G comprises the main CPU 210 and the sub CPUs 310, 320, 330 similarly to the second embodiment. The description of the second embodiment is applied to these elements.

The arrangement structure 100G further comprises the first signal transmission route 401E similarly to the sixth embodiment. The description of the sixth embodiment is applied to this first signal transmission route 401E.

The arrangement structure 100G further comprises the second signal transmission route 402F similarly to the fourth embodiment. The description of the fourth embodiment is applied to this second signal transmission route 402F.

The sub CPUs 310, 320, 330 are arranged between the transmission path 452E of the first signal transmission route 401E and the transmission path 466F of the second signal transmission route 402F. Since the transmission path 452E is largely far from the transmission path 466F in the second direction, it is difficult that the transmission paths 452E, 466F get broken at the same time. The sub CPUs 310, 330 are arranged between the transmission paths 472, 473 of the first signal transmission route 401E and the transmission path 467F of the second signal transmission route 402F. Since the transmission paths 472, 473 are largely far from the transmission path 467F in the first direction, it is difficult that the transmission paths 472, 473, 467F get broken at the same time. Even if either one of the first signal transmission route 401E and the second signal transmission route 402F is broken under the light collision where the sub CPUs 310, 320, 330 do not get broken, the signal transmission performance is maintained. Accordingly, the vehicle VCM can maintain the basic performances (i.e., "proceeding," "retreating," "curving," and/or "stopping").

Embodiment 9

According to the design doctrine described relating to the sixth through eighth embodiments, the signal transmission loop extends leftward and rightward in the engine room. Alternatively, the signal transmission loop may extend leftward and rightward in the cabin. Since the cabin is harder than the engine room as described above, it is difficult that breakage of the signal transmission loop occurs. In a ninth embodiment, an improved arrangement structure will be described.

Figure 9:
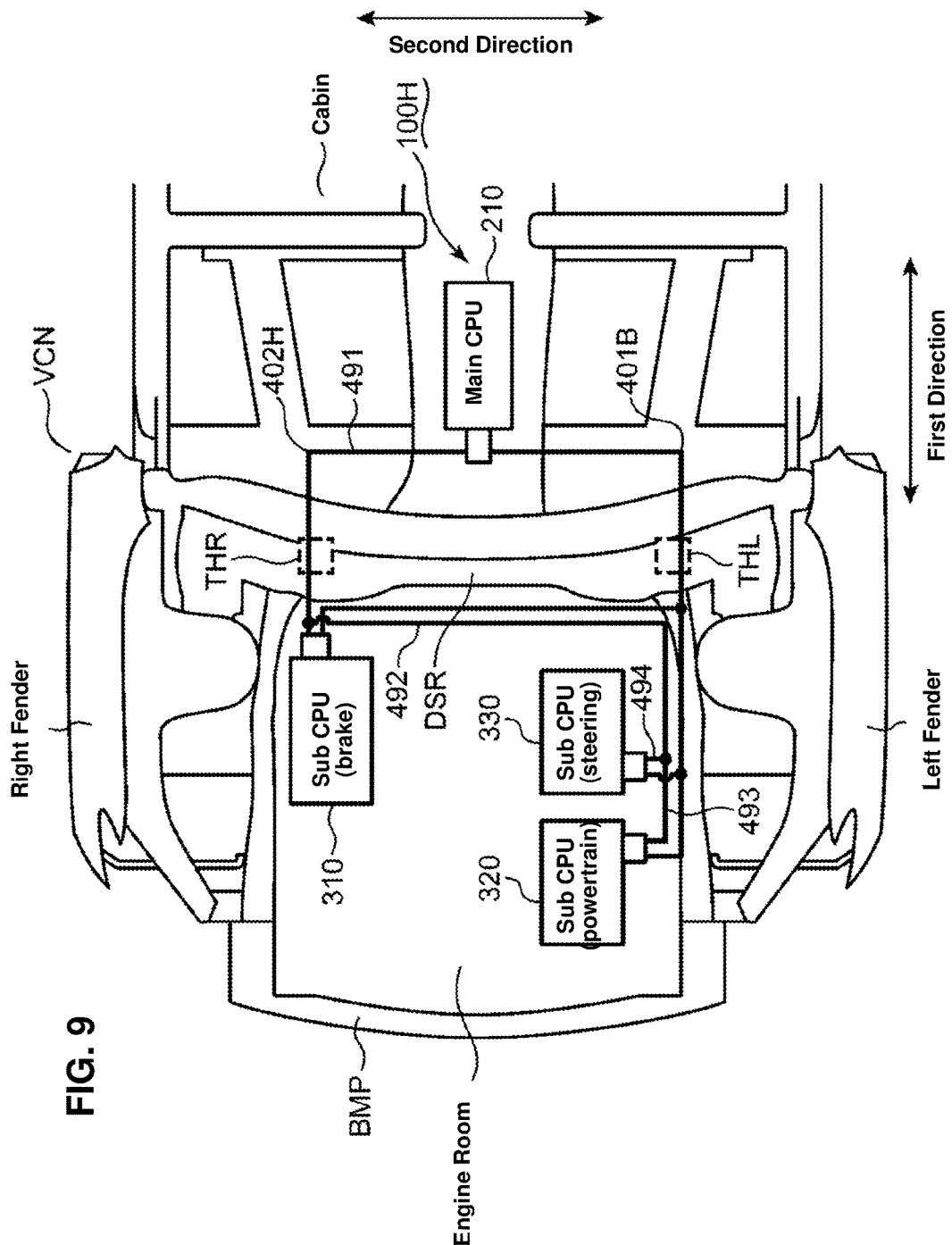
FIG. 9 is a conceptual block diagram of a wire harness arrangement structure of a ninth embodiment.

FIG. 9 is a conceptual block diagram of the wire harness arrangement structure (hereafter, referred to as an arrangement structure 100H) of the ninth embodiment. The arrangement structure 100H will be described referring to FIG. 9. The descriptions of the above-described embodiments are applied to elements of the ninth embodiment which are denoted by the same reference characters as the above-described embodiments.

FIG. 9 is a schematic plan view of a vehicle VCN. The vehicle VCN includes the bumper BMP similarly to the third embodiment. The description of the third embodiment is applied this bumper BMP.

The vehicle VCN includes a dash panel DSR. The dash panel DSR partitions a space inside the vehicle VCN into an engine room and a cabin. The engine room is formed between the dash panel DSR and the bumper BMP. The cabin is formed in back of the dash panel DSR.

The dash panel DSR has the penetration hole THL similarly to the third embodiment. The description of the third embodiment is applied to this penetration hole THL.

The dash panel DSR further has a penetration hole THR. The penetration hole THL is positioned near the left fender, and the penetration hole THR is positioned near the right fender. In the present embodiment, the first penetration hole is exemplified by the penetration hole THL. The second penetration hole is exemplified by the penetration hole THR.

The arrangement structure 100H comprises the main CPU 210 and the sub CPUs 310, 320, 330 similarly to the second embodiment. The description of the second embodiment is applied to these elements.

The arrangement structure 100H comprises the first signal transmission route 401B similarly to the third embodiment. The description of the third embodiment is applied to this first signal transmission route 401B.

The arrangement structure 100H further comprises a second signal transmission route 402H. The second signal transmission route 402H include transmission paths 491, 492, 493, 494. The transmission path 491 extends rightward (i.e., the second direction) from the main CPU 210 and is bent forward near the right fender. The transmission path 491 passes through the penetration hole THR and is connected to the sub CPU 310. The transmission path 492 is branched from the transmission path 491 at a position located in front of the penetration hole THR and extends leftward (i.e., the second direction) along the dash panel DSR. The transmission path 493 extends forward (i.e., the first direction) from a left end of the transmission path 492 at a position located near the left fender and is connected to the sub CPU 320. The transmission path 494 is branched rightward from the transmission path 493 and is connected to the sub CPU 330.

The transmission path 451 of the first signal transmission route 401B extends leftward from the main CPU 210 in the cabin, and the transmission path 491 of the second signal transmission route 402H extends rightward from the main CPU 210 in the cabin. Accordingly, it is difficult that the transmission paths 451, 491 get broken at the same time.

Embodiment 10

Designers may make another signal transmission loop by combining the design doctrines described relating to the fourth embodiment and the ninth embodiment. In a tenth embodiment, an improved arrangement structure will be described.

Figure 10:
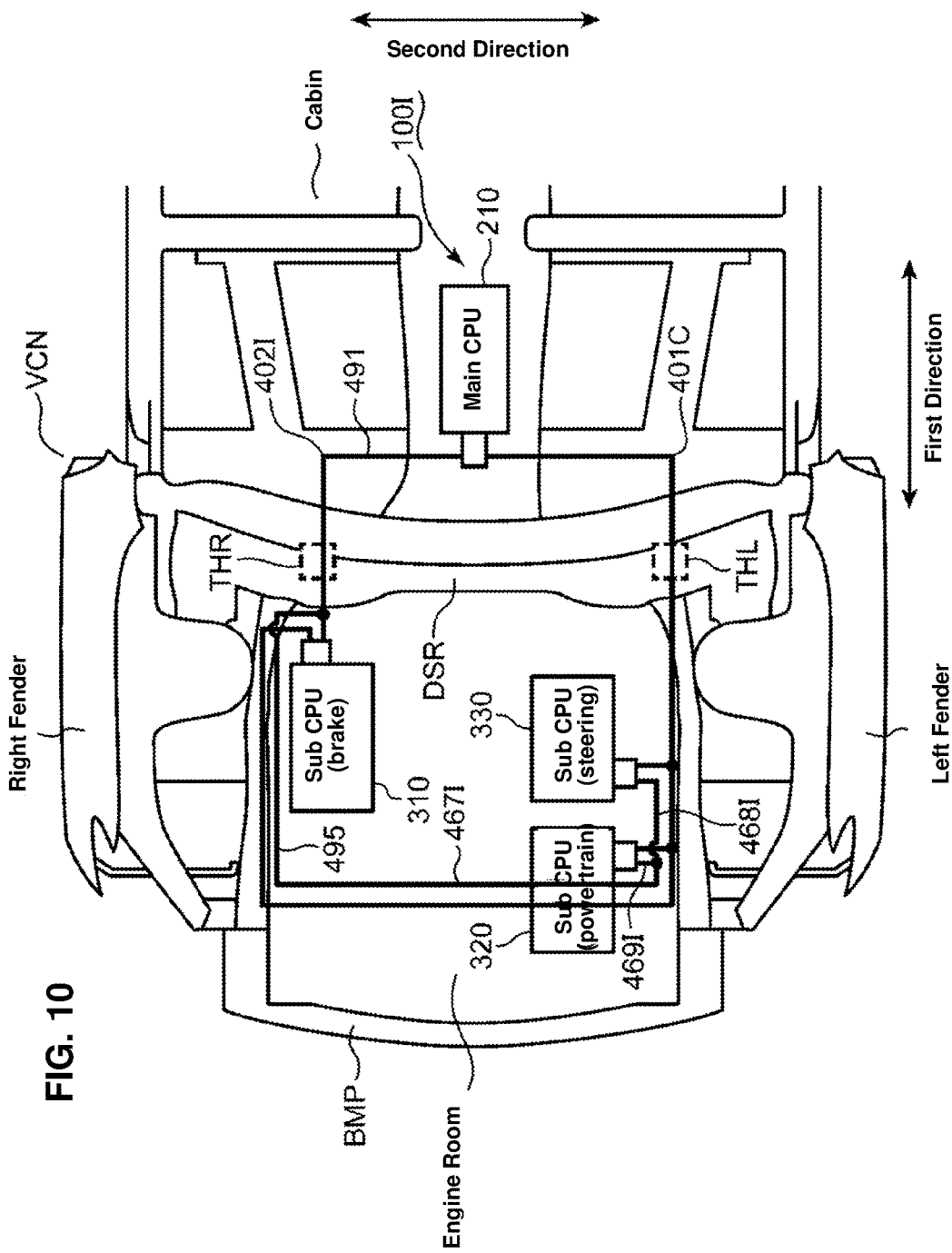
FIG. 10 is a conceptual block diagram of a wire harness arrangement structure of a tenth embodiment.

FIG. 10 is a conceptual block diagram of the wire harness arrangement structure (hereafter, referred to as an arrangement structure 100I) of the tenth embodiment. The arrangement structure 100I will be described referring to FIG. 10. The descriptions of the above-described embodiments are applied to elements of the tenth embodiment which are denoted by the same reference characters as the above-described embodiments.

The arrangement structure 100I is installed to the vehicle VCN similarly to the ninth embodiment. The description of the ninth embodiment is applied to the vehicle VCN.

The arrangement structure 100I comprises the main CPU 210 and the sub CPUs 310, 320, 330 similarly to the second embodiment. The description of the second embodiment is applied to these elements.

The arrangement structure 100I further comprises the first signal transmission route 401C similarly to the fourth embodiment. The description of the fourth embodiment is applied to this first signal transmission route 401C.

The arrangement structure 100I further comprises a second signal transmission route 402I. The second signal transmission route 402I includes the transmission path 491 similarly to the ninth embodiment. The description of the ninth embodiment is applied to this transmission path 491.

The second signal transmission route 402I includes transmission paths 495, 467I, 468I, 469I. The transmission path 495 is branched rightward (i.e., the second direction) from the transmission path 491 at a position located in front of the penetration hole THR and extends forward (i.e., the first direction) along the right fender. The transmission path 467I extends leftward (i.e., the second direction) from a front end of the transmission path 495 so as to overlap the sub CPU 320. The transmission path 468F extends rearward from a left end of the transmission path 467F. The transmission path 469F is branched leftward from the transmission path 468F and is connected to the sub CPU 320. The transmission path 468I extends rearward (i.e., the first direction) from a left end of the transmission path 467I at a position located near the left fender and is connected to the sub CPU 330. The transmission path 469I is branched leftward from the transmission path 468I and is connected to the sub CPU 320.

Embodiment 11

Designers may make another signal transmission loop by combining the design doctrines described relating to the third embodiment and the tenth embodiment. In an eleventh embodiment, an improved arrangement structure will be described.

Figure 11:
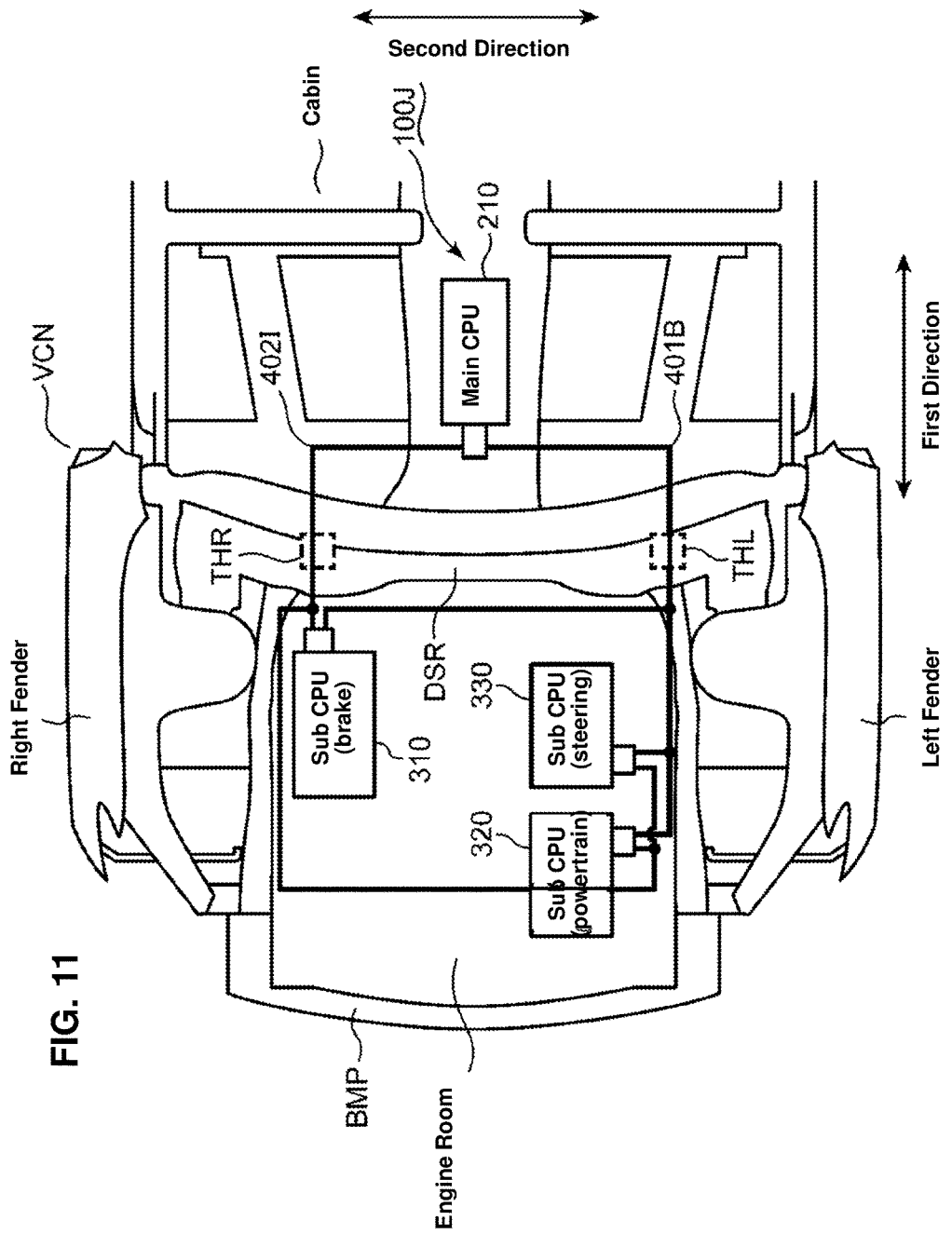
FIG. 11 is a conceptual block diagram of a wire harness arrangement structure of an eleventh embodiment.

FIG. 11 is a conceptual block diagram of the wire harness arrangement structure (hereafter, referred to as an arrangement structure 100J) of the eleventh embodiment. The arrangement structure 100J will be described referring to FIG. 11. The descriptions of the above-described embodiments are applied to elements of the eleventh embodiment which are denoted by the same reference characters as the above-described embodiments.

The arrangement structure 100J is installed to the vehicle VCN similarly to the ninth embodiment. The description of the ninth embodiment is applied to the vehicle VCN.

The arrangement structure 100J comprises the main CPU 210 and the sub CPUs 310, 320, 330 similarly to the second embodiment. The description of the second embodiment is applied to these elements.

The arrangement structure 100J further includes the first signal transmission route 401B similarly to the third embodiment. The description of the third embodiment is applied to this first signal transmission route 401B.

The arrangement structure 100J includes the second signal transmission route 402I similarly to the tenth embodiment. The description of the tenth embodiment is applied to this second signal transmission route 402I.

Embodiment 12

The vehicle includes generally a reinforcing frame to improve the rigidity of the engine room. The reinforcing frame may be used for arrangement of the wire harness. In a twelfth embodiment, an exemplified layout of the wire harness in the engine room will be described.

Figure 12:
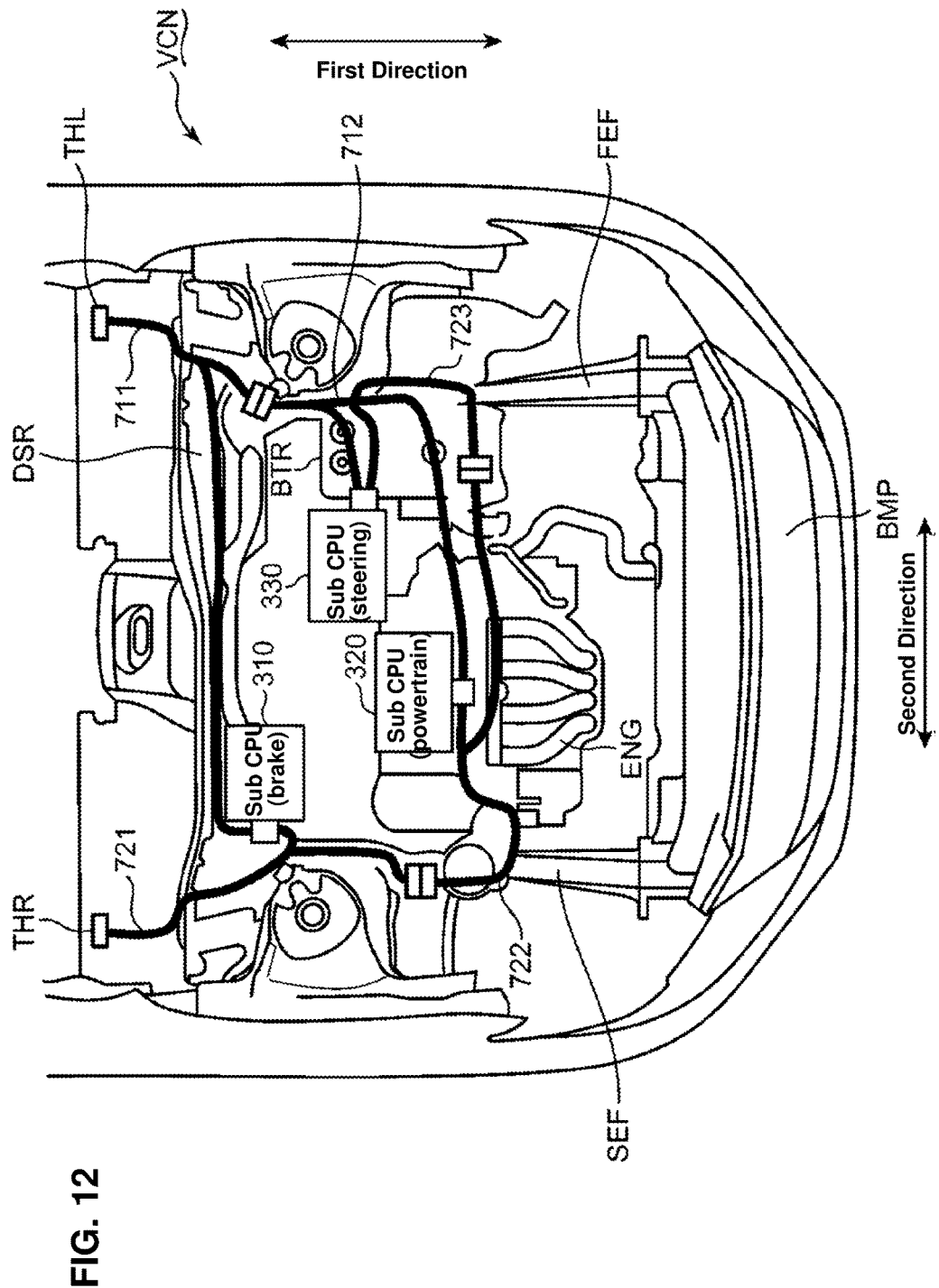
FIG. 12 is a schematic plan view of an engine room of a vehicle (a twelfth embodiment).

FIG. 12 is a schematic plan view of the engine room of the vehicle VCN. A structure of the engine room of the vehicle VCN will be described referring to FIGS. 11 and 12. The descriptions of the above-described embodiments are applied to elements of the twelfth embodiment which are denoted by the same reference characters as the above-described embodiments.

The vehicle VCN incudes the bumper BMP and the dash panel DSR as described relating to the ninth embodiment. The description of the ninth embodiment is applied to these elements.

The vehicle VCN includes two engine frames FEF, SEF. The engine frames FEF, SEF extend in the first direction between the bumper BMP and the dash panel DSR. The engine frame FEF is positioned on the left side of the engine frame SEF. In the present embodiment, a first engine frame is exemplified by the engine frame FEF. A second engine frame is exemplified by the engine frame SEF.

Various components, such as an engine ENG and a battery BTR, are arranged in a space between the engine frame FEF, SEF. The battery BTR is arranged between the engine ENG and the engine frame FEF. These components are protected by the engine frames FEF, SEF from an impact.

FIG. 12 shows the sub CPUs 310, 320, 330 described relating to the second embodiment. The description of the second embodiment is applied to the sub CPUs 310, 320, 330.

The sub CPUs 310, 320, 330 are arranged in the space between the engine frames FEF, SEF similarly to the engine ENG and the buttery BTR. As shown in FIG. 12, the sub CPU 320 to control the power train is arranged on the engine ENG. The sub CPU 320 to control the steering (not illustrated) is arranged between the engine ENG and the buttery BTR. A rack (not illustrated) of the steering may be provided to extend below the sub CPU 320. The sub CPU 310 is arranged in a corner of the engine room which is formed by the engine frame SEF and the dash panel DSR. A brake mechanism (not illustrated) may be arranged below the sub CPU 310.

FIG. 12 shows wire harnesses 711, 712, 721, 722, 723. The wire harnesses 711, 712 constitute at least part of the first signal transmission route 401B described referring to FIG. 11. The wire harnesses 721, 722, 723 constitute at least part of the second signal transmission route 402I described referring to FIG. 11.

The wire harness 711 extends from the left-side penetration hole THL of the dash panel DSR toward the inside of the engine room. The wire harness 711 is branched into two signal transmission paths. One of the two signal transmission paths is provided to extend along the dash panel DSR and is connected to the sub CPU 310. The other one of the two signal transmission paths is connected to the wire harness 712.

The wire harness 712 is provided to extend along the engine frame FEF and branched into two signal transmission paths. One of the two signal transmission paths is bent rightward from the engine frame FEF and connected to the sub CPU 330. The other one of the two signal transmission paths extends further toward the bumper BMP along the engine frame FEF. The other one is bent rightward from the engine frame FEF and connected to the sub CPU 320. These signal transmission paths bent from the engine frame FEF are supported at the battery BTR and the engine ENG.

The wire harness 721 extends from the right-side penetration hole THL of the dash panel DSR toward the inside of the engine room. The wire harness 721 is branched into two signal transmission paths. One of the two signal transmission paths is connected to the sub CPU 310. The other one of the two signal transmission paths extends along the engine frame SEF and is connected to the wire harness 722.

The wire harness 722 extends along the engine frame SEF and is bent leftward. The wire harness 722 is branched into two signal transmission paths at a position located near the sub CPU 320. One of the two signal transmission paths is connected to the sub CPU 320. The other one of the two signal transmission paths is provided to extend toward the engine frame FEF and connected to the wire harness 723 at a position located near the engine frame FEF. The wire harness 723 extends leftward and is bent toward the dash panel DSR above the engine frame FEF. The wire harness 723 extends along the engine frame FEF and is bent leftward. Finally, the wire harness 723 is connected to the sub CPU 330.

Embodiment 13

A reinforcing frame (a cross car beam, for example) which extends in the vehicle width direction (i.e., the second direction) is arranged in back of the dash panel in many cases. The wire harness extending from the main CPU may be attached to the vehicle by using the reinforcing frame. In a thirteenth embodiment, an arrangement of the wire harness using the reinforcing frame will be described.

Figure 13A:
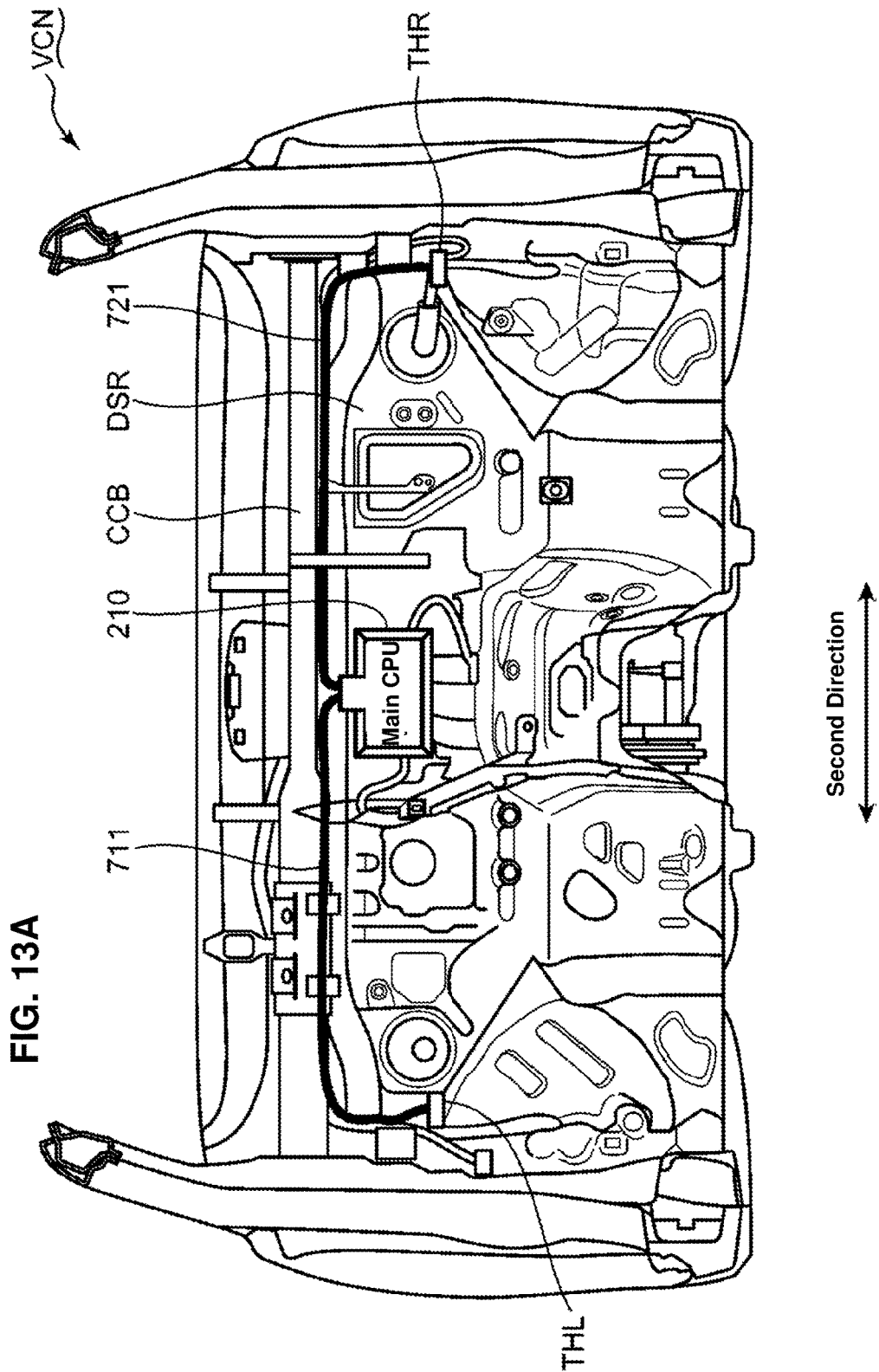
FIG. 13A is a schematic back view of a dash panel of the vehicle shown in FIG. 12 (a thirteenth embodiment).
Figure 13B:
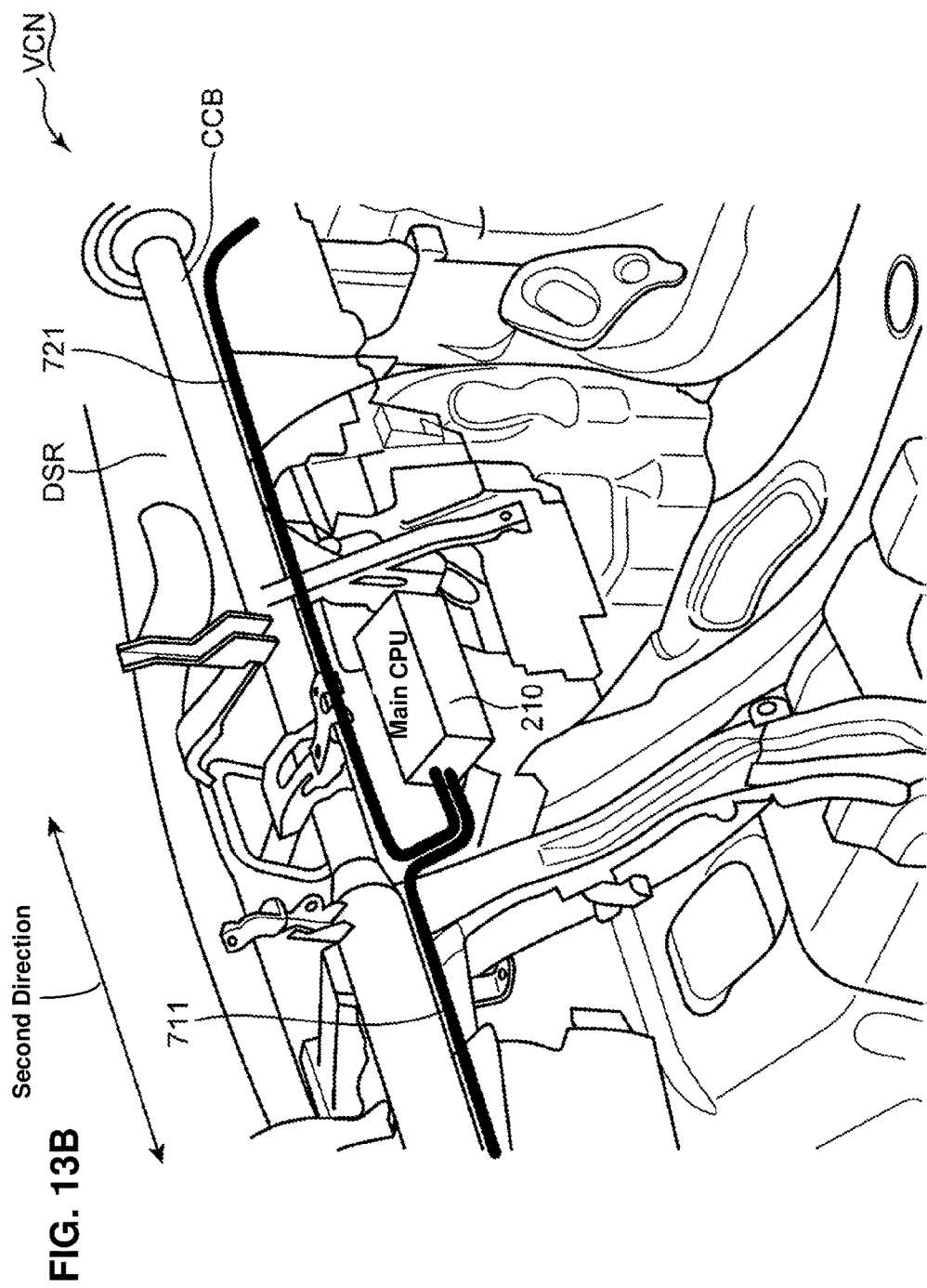
FIG. 13B is a schematic perspective view of the dash panel shown in FIG. 13A.

FIG. 13A is a schematic back view of the dash panel DSR of the vehicle VCN. FIG. 13B is a schematic perspective view of the dash panel DSR. A structure of a cabin of the vehicle VCN will be described referring to FIGS. 12 and 13B. The descriptions of the above-described embodiments are applied to elements of the thirteenth embodiment which are denoted by the same reference characters as the above-described embodiments.

The vehicle VCN comprises a cross car beam CCB. The cross car beam CCB extends in the second direction at a position located in back of the dash panel DSR. The cross car beam CCB increases the rigidity of the second direction of the vehicle VCN. In the present embodiment, the reinforcing frame is exemplified by the cross car beam CCB.

The wire harnesses 711, 721 described referring to FIG. 12 are inserted into the cabin positioned in back of the dash panel DSR through the penetration holes THL, THR. The wire harnesses 711, 721 are provided to extend rightward and leftward along the cross car beam CCB and connected to the main CPU 210. The wire harnesses 711, 721 may be fixed to the cross car beam CCB. In the present embodiment, the first wire harness is exemplified by the wire harness 711. The second wire harness is exemplified by the wire harness 722.

Figure 14:
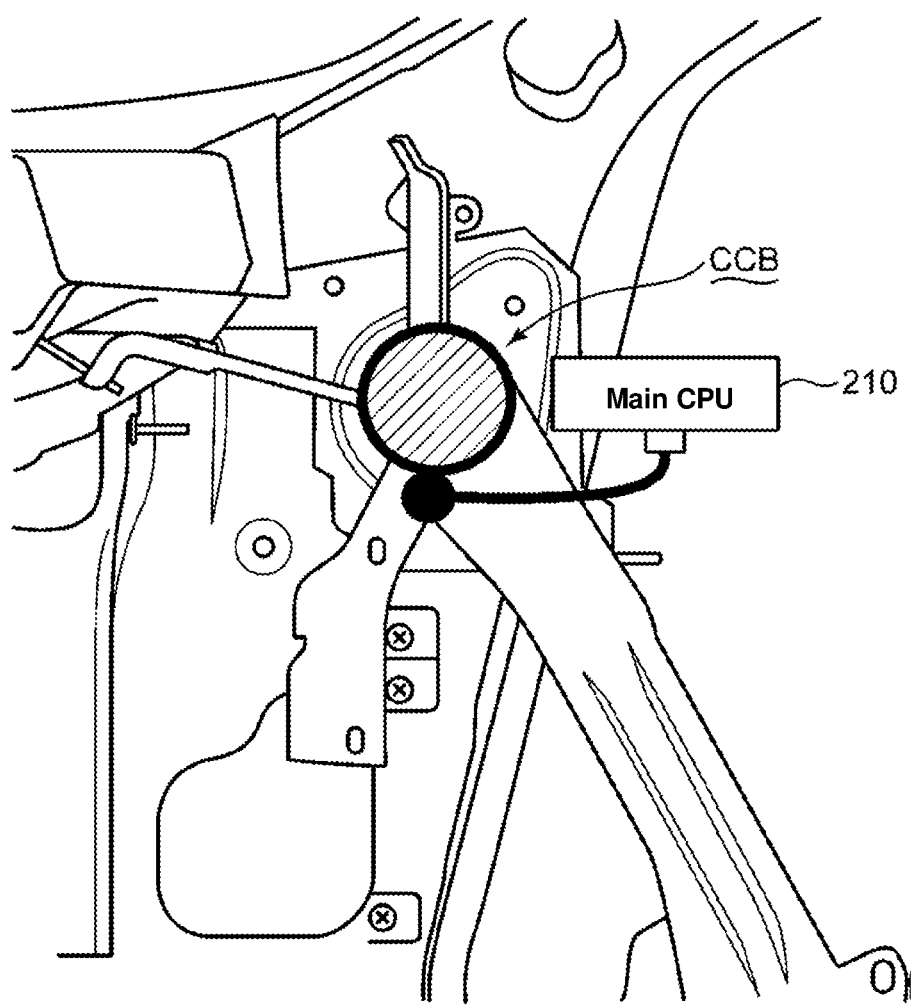
FIG. 14 is a schematic sectional view of a cross car beam of the vehicle shown in FIGS. 12 and 13B.

FIG. 14 is a schematic sectional view of the cross car beam CCB. A positional relationship between the main CPU 210 and the cross car beam CCB will be described referring to FIG. 14.

The main CPU 210 is arranged near the cross car beam CCB. Preferably, the main CPU 210 is arranged in back of the cross car beam CCB. Consequently, the main CPU 210 is protected by the cross car beam CCB from an impact generated from the side or an impact generated from the front side.

The doctrines of the above-described various embodiments may be combined so as to meet demands for the vehicle. Part of various features described relating to one of the above-described various embodiments may be applied to the arrangement structure described relating to the other one of the above-described various embodiments.

The doctrines of the above-described embodiments are preferably usable in designing of various vehicles.

What is claimed is:

1. A wire harness arrangement structure of a vehicle, comprising:
    plural component control parts to control plural electric components for governing a drive of the vehicle, said plural component control parts are provided between a front end of the vehicle and a dash panel of the vehicle;
    a main control part to generate a command signal for providing a command to the plural component control parts, said main control part is provided in back of the dash panel; and
    plural main wire harnesses to transmit the command signal to the plural component control parts,
    wherein said plural electric components include at least a brake, an engine, a transmission, and a steering, said plural main wire harnesses comprise first signal transmission routes which extend from said main control part to said plural component control parts, respectively, and second signal transmission routes which extend from the main control part to the plural component control parts, respectively, and said command signal is transmitted to the main control part to the plural component control parts through said first signal transmission routes and said second signal transmission routes; and said first signal transmission route constitutes at least partially a first transmission path which extends in a first direction which is directed toward the front end of the vehicle from the dash panel, at least part of said second signal transmission route constitutes a second transmission path which is spaced apart from said first transmission path in a second direction perpendicular to said first direction and extends in the first direction, and at least part of said plural electric components is provided between said first transmission path and said second transmission.

2. The wire harness arrangement structure of the vehicle of claim 1, wherein only said plural component control parts to control the brake, the engine, the transmission, and the steering are electrically connected to said first signal transmission routes and said second signal transmission routes.

3. The wire harness arrangement structure of the vehicle of claim 1, further comprising:
   a sub control part to control another onboard component than the brake, the engine, the transmission, and the steering; and
   a sub wire harness to constitute a single-line signal transmission route between said sub control part and said main control part.

4. The wire harness arrangement structure of the vehicle of claim 1, wherein part of said first signal transmission route constitutes a third transmission path which extends in said second direction along the dash panel of the vehicle, part of said second signal transmission route constitutes a fourth transmission path which is spaced apart from said third transmission path in said first direction and extends in the second direction, and at least part of said plural electric components is provided between said third transmission path and said fourth transmission path.

5. The wire harness arrangement structure of the vehicle of claim 1, wherein said vehicle includes a first engine frame which extends between the front end of the vehicle and the dash panel and a second engine frame which extends between the front end of the vehicle and the dash panel at a position which is spaced apart from said first engine frame in said second direction, said first transmission path is formed along the first engine frame, and said second transmission path is formed along said second engine frame.

6. The wire harness arrangement structure of the vehicle of claim 1, wherein a first penetration hole and a second penetration hole are formed at the dash panel, said second penetration hole is provided at a position which is offset, in said second direction, from said first penetration hole, and said plural main wire harnesses include a first wire harness which extends from said main control part toward the first penetration hole and a second wire harness which extends from the main control part toward the second penetration hole.

7. The wire harness arrangement structure of the vehicle of claim 6, wherein the vehicle includes a reinforcing frame which extends in said second direction in back of the dash panel, and said first wire harness and said second wire harness are provided to extend along said reinforcing frame.

* * * * *